United States Patent [19]

Hirosawa et al.

[11] Patent Number: 4,807,020

[45] Date of Patent: Feb. 21, 1989

[54] IMAGE REPRODUCING SYSTEM HAVING MULTIPLE PROCESSING LEVELS

[75] Inventors: Makoto Hirosawa, Kyoto; Susumu Yamada, Osaka, both of Japan

[73] Assignee: Dainippon Screen Mfg. Co., Ltd., Kyoto, Japan

[21] Appl. No.: 630,391

[22] Filed: Jul. 13, 1984

[30] Foreign Application Priority Data

Sep. 13, 1983 [JP] Japan ................................ 58-168861

[51] Int. Cl.[4] ........................ H04N 1/46; H04N 1/387; H04N 1/40; G03F 3/08

[52] U.S. Cl. ........................................ 358/75; 358/78; 358/80; 358/256; 358/280; 358/283

[58] Field of Search ....................... 358/75, 75 I, 75 J, 358/78, 80, 280, 283, 256

[56] References Cited

U.S. PATENT DOCUMENTS

| | | | |
|---|---|---|---|
| 4,405,951 | 9/1983 | Omori et al. | 358/256 |
| 4,454,575 | 6/1984 | Bushaw et al. | 358/256 |
| 4,470,074 | 9/1984 | Yamada | 358/75 |
| 4,566,039 | 1/1986 | Oya | 358/280 |
| 4,591,904 | 5/1986 | Urabe et al. | 358/75 |
| 4,593,323 | 6/1986 | Kanda et al. | 358/256 |
| 4,622,582 | 11/1986 | Yamada | 358/75 |
| 4,642,680 | 2/1987 | Yamada | 358/75 |
| 4,652,936 | 3/1987 | Hatayama | 358/75 |
| 4,672,462 | 6/1987 | Yamada | 358/256 |
| 4,684,979 | 8/1987 | Hirosawa | 358/75 |
| 4,691,238 | 9/1987 | Yamada | 358/280 |
| 4,734,782 | 3/1988 | Maeshima | 358/280 |
| 4,739,397 | 4/1988 | Hayashi | 358/75 |

FOREIGN PATENT DOCUMENTS

| | | | |
|---|---|---|---|
| 3014670 | 10/1980 | Fed. Rep. of Germany . | |
| 3030865 | 3/1981 | Fed. Rep. of Germany . | |
| 2063005 | 5/1981 | United Kingdom . | |
| 2100093 | 12/1982 | United Kingdom . | |
| 2124055 | 2/1984 | United Kingdom | 358/75 |

OTHER PUBLICATIONS

Affeldt, Jürgen, Editor, "Klischograph 1/79", published by Dr.-Ing. Rudolf Hell GmbH, Kiel, West Germany, 1979, pp. 4-10, 18-21.

Koda, Shozo, et al., "High-Speed Fagsimile Copix TM, 8100, 9100 and 4800", Toshiba Review, No. 126, Mar.-Apr. 1980, pp. 9-13.

*Primary Examiner*—James J. Groody
*Assistant Examiner*—Randall S. Svihla
*Attorney, Agent, or Firm*—Lowe, Price, LeBlanc, Becker & Shur

[57] ABSTRACT

Image reproduction condition data requisite for reproducing the images of plural originals are stored in a memory. In the system, certain of the data are automatically rad and set up to implement circuits which process image data successively for all the originals. A master processor communicates with intermedlate processors. The implement circuits are controlled by subrodinate processors, which in turn are responsive to the intermediate processors or to the master processor. The system is further operable for accepting input of scanning condition data for one original while the system is reproducing an image of another original.

25 Claims, 21 Drawing Sheets

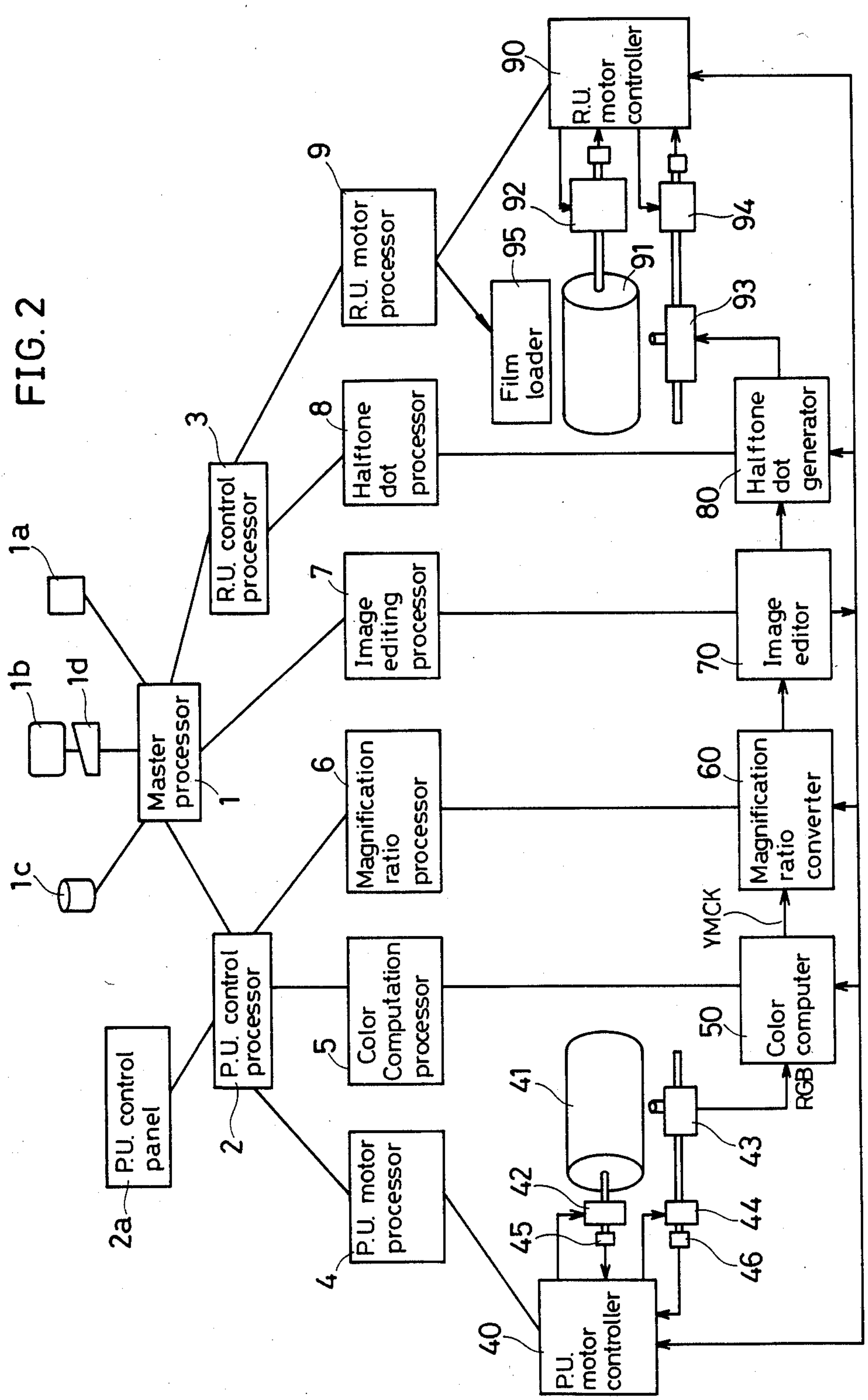
FIG. 2
Master processor
1
1a
1b
1c
1d
P.U. control panel
2a
P.U. control processor
2
R.U. control processor
3
P.U. motor processor
4
Color Computation processor
5
Magnification ratio processor
6
Image editing processor
7
Halftone dot processor
8
R.U. motor processor
9
P.U. motor controller
40
41
42
43
44
45
46
Color computer
50
RGB
YMCK
Magnification ratio converter
60
Image editor
70
Halftone dot generator
80
R.U. motor controller
90
91
92
93
94
Film loader
95

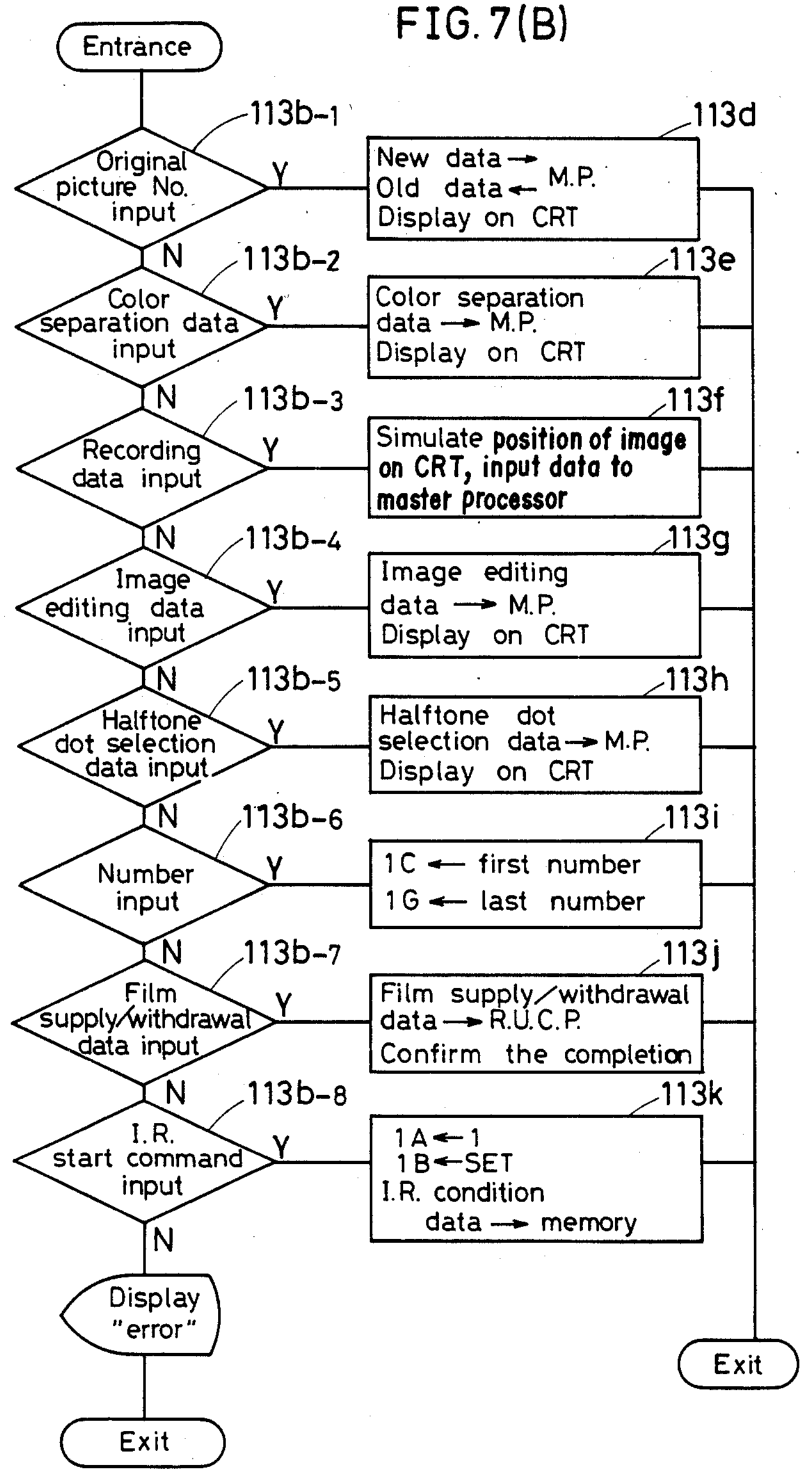
FIG. 7(B)
Entrance
113b-1
Original picture No. input
Y
N
113d
New data → M.P.
Old data ← M.P.
Display on CRT
113b-2
Color separation data input
113e
Color separation data → M.P.
Display on CRT
113b-3
Recording data input
113f
Simulate position of image on CRT, input data to master processor
113b-4
Image editing data input
113g
Image editing data → M.P.
Display on CRT
113b-5
Halftone dot selection data input
113h
Halftone dot selection data → M.P.
Display on CRT
113b-6
Number input
113i
1C ← first number
1G ← last number
113b-7
Film supply/withdrawal data input
113j
Film supply/withdrawal data → R.U.C.P.
Confirm the completion
113b-8
I.R. start command input
113k
1A ← 1
1B ← SET
I.R. condition data → memory
Display "error"
Exit
Exit

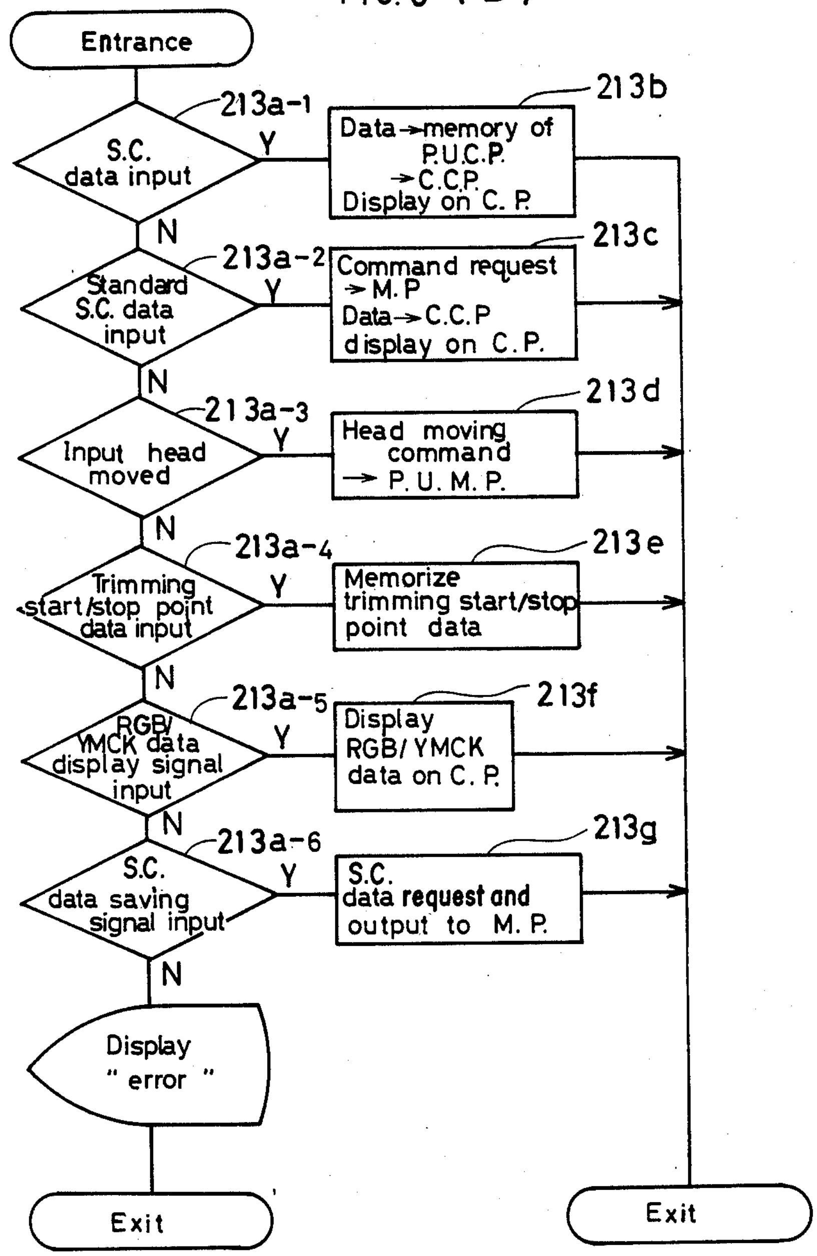
FIG.8 (B)
Entrance
213a-1
S.C. data input
Y
N
213b
Data→memory of P.U.C.P. →C.C.P. Display on C. P.
213a-2
Standard S.C. data input
213c
Command request →M. P Data→C.C.P display on C.P.
213a-3
Input head moved
213d
Head moving command → P. U. M. P.
213a-4
Trimming start/stop point data input
213e
Memorize trimming start/stop point data
213a-5
RGB/ YMCK data display signal input
213f
Display RGB/ YMCK data on C. P.
213a-6
S.C. data saving signal input
213g
S.C. data request and output to M. P.
Display " error "
Exit
Exit Start
511
C.C.P., I/F → initial stage
512
Command input from P.C.U.P.
N
Y
513-1
S.C. condition data input
Y
N
514
S.C. condition data → C.C.
513-2
RGB/YMCK data output command input
Y
N
515
RGB/YMCK data → P.U.C.P
513-3
S.C. data setup command input
Y
N
516
S.C. data → C.C. command request → P.U.C.P.
517
Operate C.C. according to I.R. start signal
518
When scanning ends, output command request
Display " error"

IMAGE REPRODUCING SYSTEM HAVING MULTIPLE PROCESSING LEVELS

FIELD OF THE INVENTION

This invention relates to an image reproducing system, particularly to such a system in which data requisite for reproducing images are stored in a main memory, whereby a master processor manages the entire image reproducing process by using said data.

BACKGROUND OF THE INVENTION

FIG. 1 shows a conventional drum scanner system, which operates as follows. That is, an input scanning drum 41' is revolved by a motor 42', while an input scanning head 43' provided against the drum 41' is moved along a feed screw by a motor 44'. The head 43' scans an original to obtain color component signals R (Red), G (Green) and B (Blue). In this operation, the motors 42' and 44' are respectively controlled by a motor controller 40'. The color component signals R, G and B undergo color correction, gradation correction and so forth in a color computer 50' to be converted into color separation signals Y (Yellow), M (Magenta), C (Cyan) and K (Black). The color separation image signals Y, M, C and K undergo magnification conversion of their main scanning direction factors (wherein the main scanning direction is the revolving direction of the input scanning (recording) drum) by a magnification ratio converter 60' and they are respectively converted by a halftone dot generator 80' into corresponding halftone dot signals, by which a recording beam emitted from a recording head 93' is controlled to expose a photosensitive material (including films) mounted on a recording drum 91'. On the other hand, the recording drum 91' is revolved by a motor 92' under the control of a motor controller 90'. While the recording head 93' is moved in the sub-scanning direction (wherein the sub-scanning direction is the direction parallel to the axis of the input scanning (recording) drum) along a feed screw by a motor 94' under the control of the motor controller 90' as well.

As mentioned above, it is recognized that, for obtaining plural color separation images of an original, various data requisite for reproducing the images, i.e., condition data for color computing and magnification ratio data of both the main and the sub-scanning direction factors, are needed to be set up, or provided, respectively to the color computer 50', the magnification converter 60' and to the motor controllers 40' and 90'. Thus conventionally the various data have been manually input by means of function keys connected to the devices mentioned above.

However, in such a conventional manner as mentioned above, a data input process to set up various condition data for the next original must be repeated every time the present original is scanned. This will be especially disadvantageous when color separation images are recorded onto desired portions of a photosensitive material according to a desired layout pattern by scanning a plurality of originals. That is, it is necessary for an operator to operate various switches and function keys for every original, which is very complicated and time-consuming even for a highly-skilled operator.

SUMMARY OF THE INVENTION

In view of the above-mentioned drawbacks, a system according to this invention is proposed for carrying out the following objects.

A prime object of this invention is to provide an image reproducing system in which, by previously inputting condition data requisite for reproducing images of plural originals to a main memory, the data are automatically read and set up to each of a plurality of implement circuits, described below, while photosensitive materials are automatically supplied to or withdrawn from a recording drum.

To attain the above objects, a system according to this invention comprises a main processor and subordinate processors.

The main processor controls the subordinate processors as well as transmits data requisite for reproducing a plurality of originals stored in a memory to the subordinate processors according to an operator's designation.

The subordinate processors are provided to individually control the implement circuits when the data are set up to the implement circuits.

The main processor comprises a master processor and interface processors which mediate the master processor and the subordinate processors.

The system of this invention performs the functional steps of: storing data requisite for reproducing images of originals such as color separation condition data, magnification ratio data and so forth into a main memory; carrying out the image reproduction process by setting up the data to processing circuits such as said color computer beforehand according to an operator's designation; and successively exchanging the setup data for the succeeding originals. This data setup work can be carried out while the system is in the image reproduction process.

The above and other objects and features of this invention can be appreciated more fully from the following detailed description when read with reference to the accompanying drawings.

BRIEF DESCRIPTION OF THE DRAWINGS

FIG. 2 shows the basic structure of the system of this invention.

FIGS. 8(A)–(C) show a flow chart of the operation of a P.U. control processor.

PREFERRED EMBODIMENT OF THE INVENTION

Figure 1:
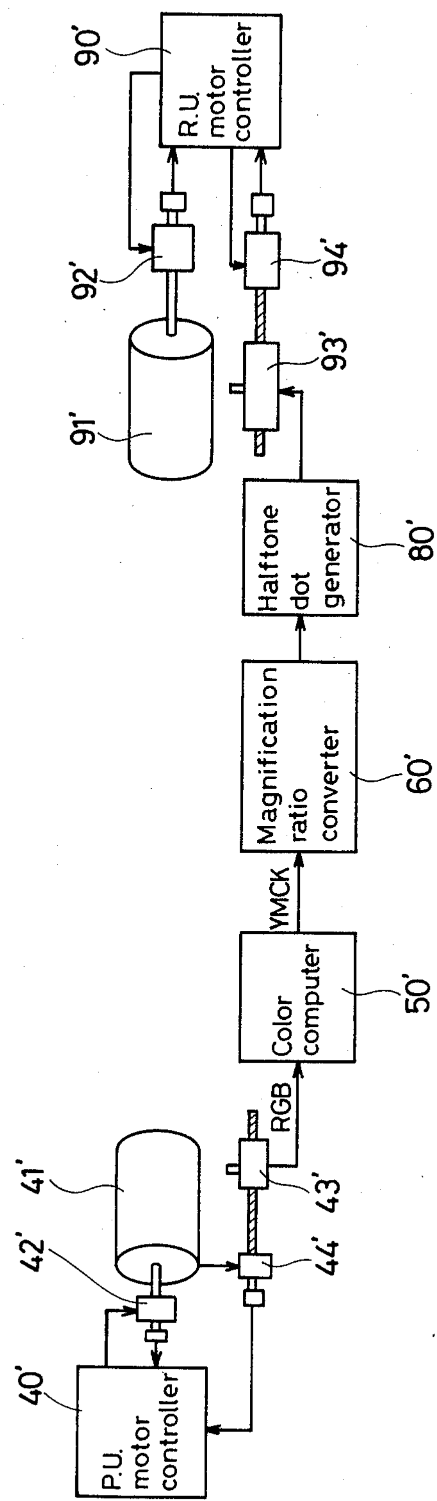
FIG. 1 shows a conventional image reproducing system.

FIG. 2 shows that basic structure of the system of this invention.

A P.U. (Pickup Unit) motor controller 40, an R.U. (Recording Unit) motor controller 90, a color computer 50, a magnification ratio converter 60, a halftone dot generator 80 and an image editor 70 (whose function is mentioned later) are provided as the implement circuits, as shown in FIG. 2. On the other hand, a film loader 95 is provided to reciprocate photosensitive materials with a recording drum 91 at an operator's command.

The abovementioned implement circuits are controlled respectively by a P.U. motor processor 4, an R.U. motor processor 9, a color computation processor 5, a magnification ratio processor 6, a halftone dot processor 8 and an image editing processor 7. These processors control the abovementioned implement circuits 40 to 90 on command of a master processor 1. Although the processors 40 to 90 can be controlled directly by the master processor 1, the embodiment of FIG. 2 employs a P.U. control processor 2 and an R.U. control processor 3 as mediate or interface processors (mentioned later) in order to improve the controllability of the processors as well as to reduce the processing time of the system. Precisely, the P.U. control processor 2 mediates, or interfaces between the master processor 1 and the processors 4, 5 and 6. Besides, the P.U. control processor 2 is equipped with a P.U. control panel $2_a$ to input necessary data to the processors 4, 5 and 6. By means of the control panel $2_a$, an operator inputs coordinate value(s) of a trimming start point (and a stop point) obtained by moving an input scanning head 43 to the P.U. control processor 2. These values are afterwards set up to the P.U. motor processor 4, the color computation processor 5 and to the magnification ratio processor 6. In addition, an operator simulates the tone of the reproduction image to be recorded by using the input scanning head 43 and the color computer 50 in order to input desired color condition data to the P.U. control processor 2.

On the other hand the R.U. control processor 3 mediates between the master processor 1 and the processors 8 and 9.

The above-mentioned processors are under the control of the master processor 1' to which necessary data are input via the control panel $2_a$, a digitizer $1_a$ and a keyboard $1_d$ of a CRT display $1_b$, and the data are stored into a main memory $1_c$ such as a disc memory.

To systematize the description, the functions and operations of said implement circuits are at first explained.

The P.U. motor controller 40 controls the revolution of an input scanning drum 41 via a motor 42 and detects the revolution number and the angular position thereof by using two kinds of pulse signals, that is, a single pulse generated once a revolution and a multiple pulse generated multiple times a revolution of the drum 41. They are output from a rotary encoder 45 which is coaxially connected and revolved with the drum 41 to control them. The P.U. motor controller 40 controls similarly the shifting speed and the position of an input scanning head 43 via a motor 44 by using a single pulse and a multiple pulse signals being output from an encoder 46 connected to the feed screw of the system.

The P.U. motor controller 40 is controlled by the P.U. motor processor 4.

Figure 3:
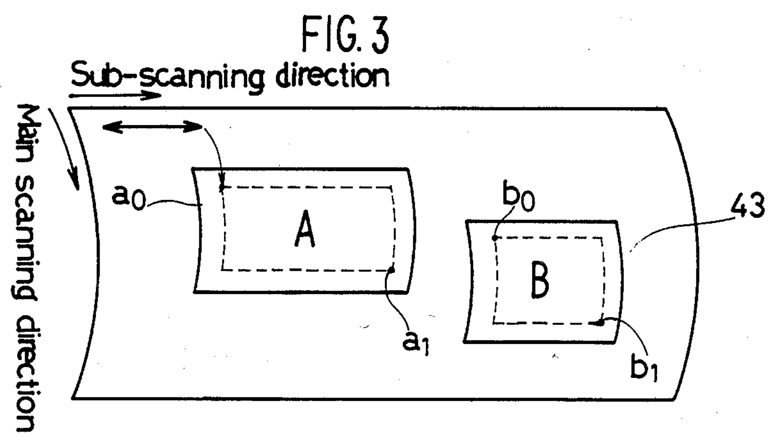
FIG. 3 shows trimming start and end points on an input scanning drum.

The pulse signals from the encoders 45 and 46 are used for inputting data of trimming start and stop points of plural originals mounted on the drum 41 to the P.U. control processor 2. More precisely, the data of the trimming start points $a_0$, $b_0$. . . and the trimming stop points $a_1$, $b_1$ . . . of respective originals A, B . . . as shown in FIG. 3 are obtained by moving the input scanning head to each point (this procedure is performed by an operator, who pushes keys of the control panel $2_a$ when each point agrees with the center of a viewing window of the head 43), and the data are input to an internal memory of the P.U. control processor 2.

The color computer 50 converts color component signals R, G and B obtained from the head 43 into color separation signals Y, M, C and K. For this operation, sharpness data are needed, which data are input from the control panel $2_a$ of the P.U. control processor 2 or from the keyboard $1_d$ of the master processor 1.

The magnification ratio converter 60 converts the magnification ratio of the main scanning direction factor by varying the ratio between the frequency for writing each of the color separation signals Y, M, C and K output from the color computer 50 into buffer memories and the frequency for reading each of them from the buffer memories.

Meanwhile, by varying the initial reading address, the recording start position can be varied in the main scanning direction as mentioned later.

The magnification ratio converter 60 is capable of reading the color separation data Y, M, C and K being stored simultaneously into the buffer memories, separately, by twos or together time-sharingly for one track of the recording drum 91 in combination with the above function. These functions can be put into operation according to designation data input from the keyboard $1_d$ of the CRT display $1_b$ via the magnification ratio processor 6. Recording position data are input from the digitizer $1_a$ as mentioned later.

The image editor 70 carries out processes of cropping, bordering (tint laying onto the border of a pictorial component), tint laying masking and blocking out on image data.

Figure 4:
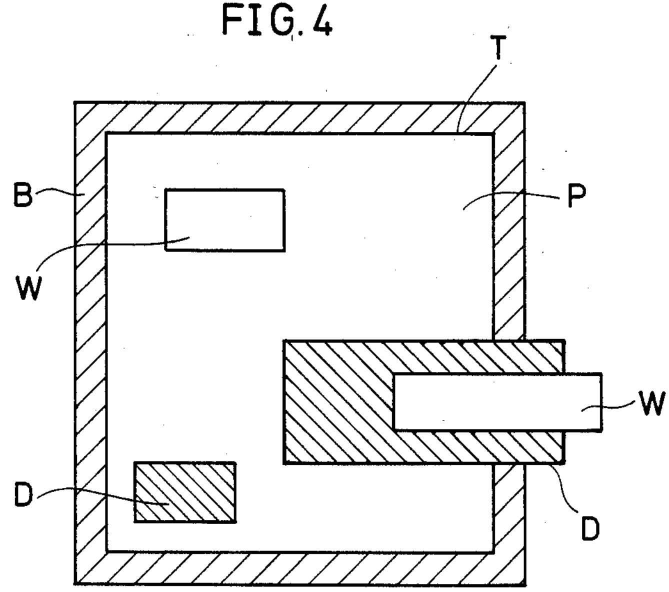
FIG. 4 shows the conception of an image editing function.

More precisely, as shown in FIG. 4, the coordinate values of desired start and stop points of the processing areas of cropping T, bordering B, tint laying masking D and blocking out W, and desired dot percentage data for the bordering and tint laying masking processes for each pictorial component are input to the master processor 1 by an operator, and are used for driving the image editor 70 via the image editing processor 7.

The priority between the processes are, for example, in order of the bordering process, the cropping process, the tint laying masking process and the blocking out process. In addition to that, the image editor 70 has a function of outputting an image reproduction start signal to the other implement circuits.

The halftone dot generator 80 generates halftone dot signals corresponding to the color separation signals Y, M, C and K output from the image editor 70 by using a standard halftone dot signal input from the halftone dot processor 8.

The R.U. motor controller 90 controls the revolution of the recording drum 91 via a motor 92 and detects the revolution number and the angular position thereof as well as the shifting speed and the position of a recording head 93 to control them via a motor 94 in accordance with the P.U. motor controller 40.

The film loader 95 has a function to supply a photosensitive material onto the recording drum 91 while withdrawing the other from the drum under the control of the R.U. motor processor 90.

Figure 5A:
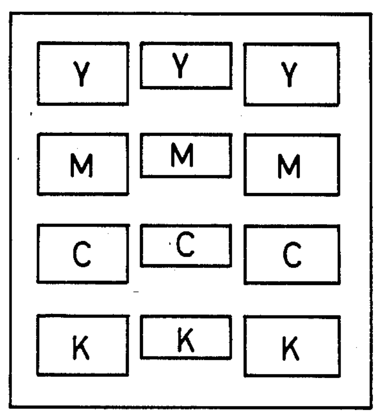
FIG. 5 shows the conception of an image allocation function.
Figure 5B:
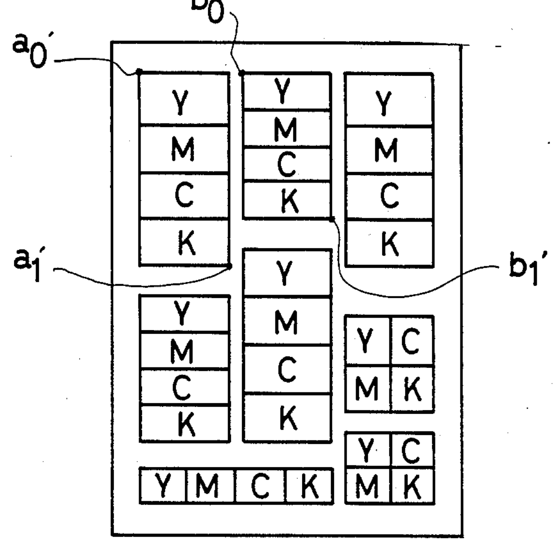

As mentioned briefly above, the system of this invention is capable of allocating plural reproduction (color separation) images onto a photosensitive material. In a conventional image reproducing system, color separation images Y, M, C and K of an original can only be allocated in line to one track of a photosensitive material as shown in FIG. 5(*a*). As against to that, in the method of this invention, four color separation images of Y, M, C and K of an original can further be arranged in a matrix or in parallel when they are reproduced on a photosensitive material as shown in FIG. 5(*b*), which function leads to more efficient use of the photosensitive material.

To put the function into practice, an operator inputs desired recording start and stop points of the color separation images Y, M, C and K corresponding to each original to the master processor 1 by means of the digitizer $1_a$ and the CRT display $1_b$. In this occasion, by inputting data of a desired number (1, 2 or 4) of the color separation image(s) to be reproduced in the main scanning direction to the master processor 1, the recording start and stop points of the second and the succeeding color separation image(s) can be determined automatically, however, the function is not explained in detail here.

Figure 6:
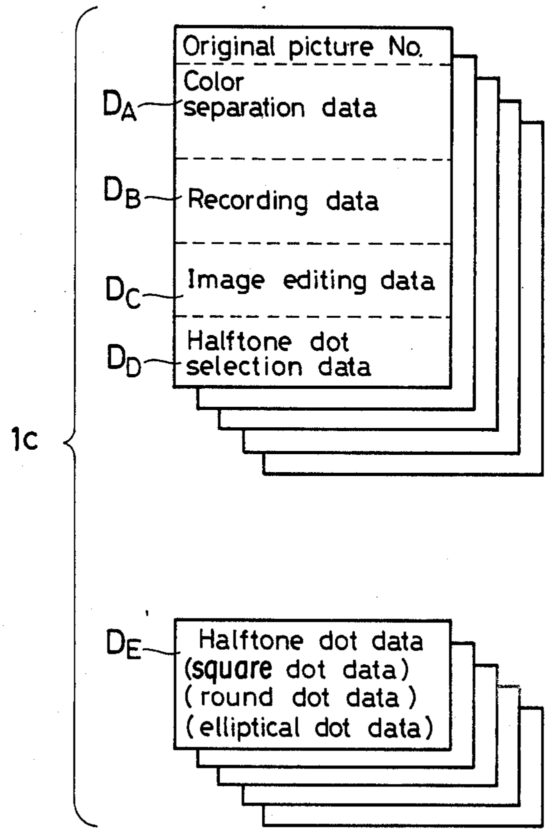
FIG. 6 shows data stored in a main memory.

Thus obtained data of recording start and stop points of each image are set up to a buffer memory of the magnification converter 60, whereby image data begin to be read from the buffer memory when the recording head 93 comes to the recording start point, and stop being read when the head 93 reaches the recording stop point. To summarize the above and related matters, data requisite for reproducing an image to be stored into a main memory $1_c$ are color separation data $D_A$, recording data $D_B$, image editing data $D_C$, halftone dot selection data $D_D$ and halftone dot data $D_E$ as shown in FIG. 6.

The color separation data $D_A$ include data of the number of an original, color separation condition, trimming start and stop points and magnification ratio, which can be input from the control panel $2_a$ of the P.U. control processor 2 or from the keyboard $1_d$ of the CRT display $1_b$.

In this, the trimming start point is the initial point $a_0$ $b_0$ . . . of the area to be actually reproduced in the main and the sub-scanning directions as shown in FIG. 3. While the trimming stop point is the last point $a_1$ $b_1$ of the area to be actually reproduced in the main and the sub-scanning directions as shown in FIG. 3.

The recording data $D_B$ include the data of the recording start and stop points, which can be input from the control panel 2*a* or from the keyboard $1_d$.

In this, the recording start point is the initial point $a'_0$ $b'_0$ . . . of the first reproduction image in the main and the sub-scanning directions to be recorded on a photosensitive material corresponding to said trimming start point as shown in FIG. 5. While the recording stop point is the last point $a'_1$ $b'_1$. . . of the last reproduction image in the main and the sub-scanning directions to be recorded on a photosensitive material corresponding to said trimming stop point as shown in FIG. 5.

The image editing data $D_C$ include process data of bordering, tint laying masking, blocking out (concretely, data of the recording start and stop points and desired halftone dot percentage of each process) to be used by the image editor 70, which are mainly input from the digitizer $1_a$.

The halftone dot selection data $D_D$ include data of the halftone dot type (square type, chain type, etc.) and the number of halftone dot lines per one inch. In this, the halftone dot data $D_E$ of several types are previously input to the main memory $1_c$, and that of a desired type is designated by an operator via the keyboard $1_d$.

The system shown in FIG. 2 operates in a way as expressed by flow charts of FIG. 7 to 15. A brief explanation of the operation is provided before a more detailed description based on the flow charts, is provided to grasp the operation as a whole.

At first, an operator inputs to the main memory $1_c$ said data requisite for reproducing images by means of the control panel $2_a$ of the P.U. control processor 2, the display $1_b$, the keyboard $1_d$ and the digitizer $1_a$ of the master processor 1.

When an operator pushes a key for designating the start of the image reproducing process, the master processor 1 reads the data from the main memory $1_c$ and sets the data up to the implement circuits (the circuits 40 to 90) via the mediate processors (the processors 2 and 3) and the subordinate processors (the processors 4 to 9). When the data are set up to respective implement circuits, they output readiness signals to the master processor via the subordinate and the mediate processors. When the master processor 1 receives the readiness signals from all the implement circuits, it outputs a command signal to the image editor 70 to output said image reproduction start signal to the other implement circuits. When plural originals are mounted on the input scanning drum 41, by giving a priority of scanning to them, the originals are successively scanned according to the priority by being automatically supplied with the corresponding image reproduction condition data.

Further explanation for the system is as follows.

Figure 7A:
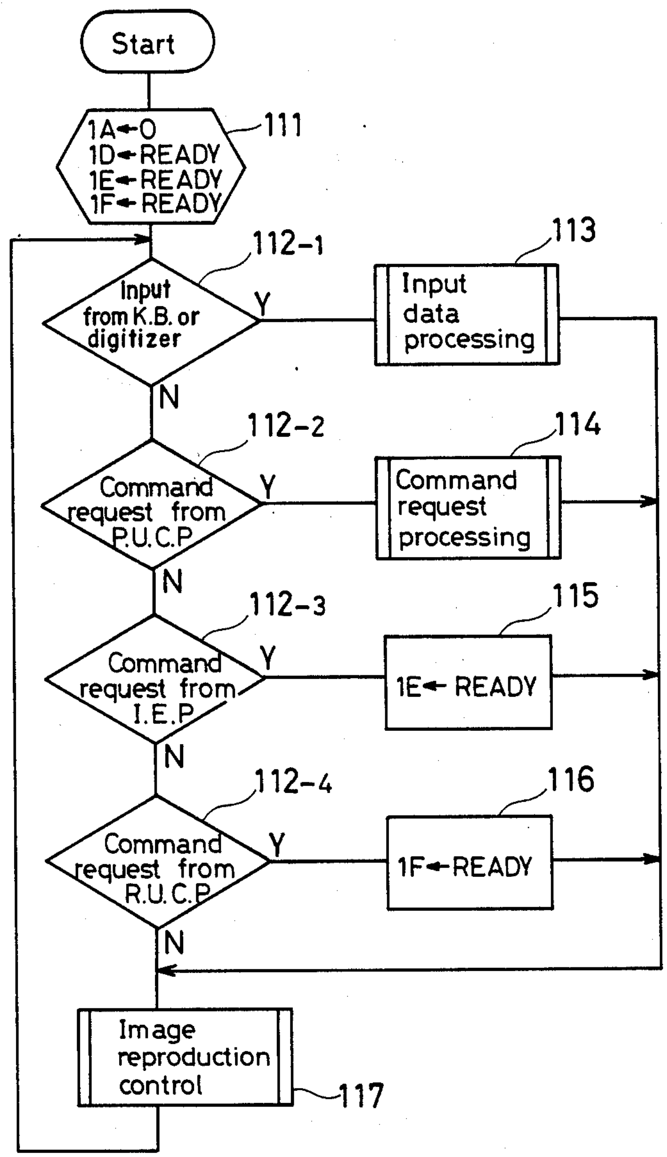
FIGS. 7(A)–7(D) show a flow chart of the operation of a master processor.
Figure 7:
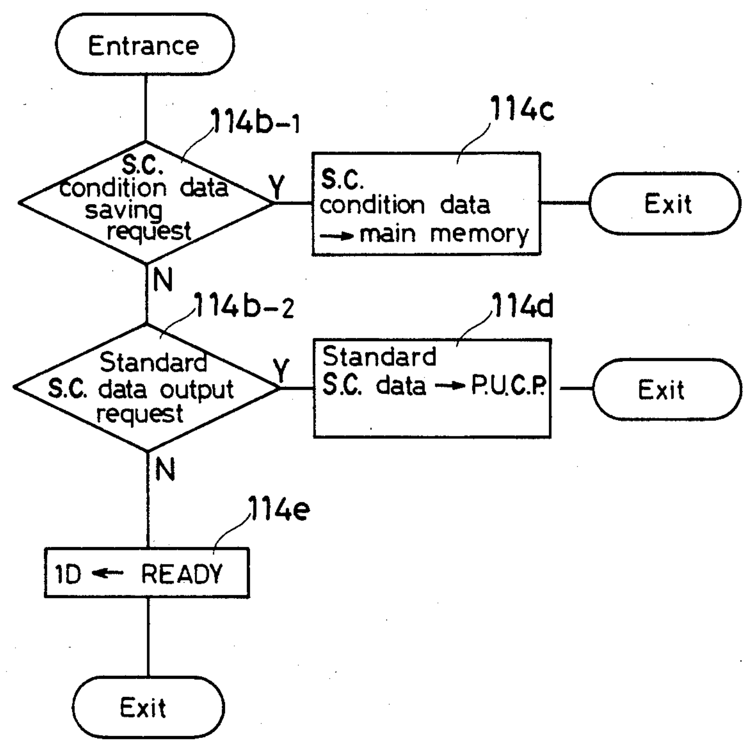
Figure 7:
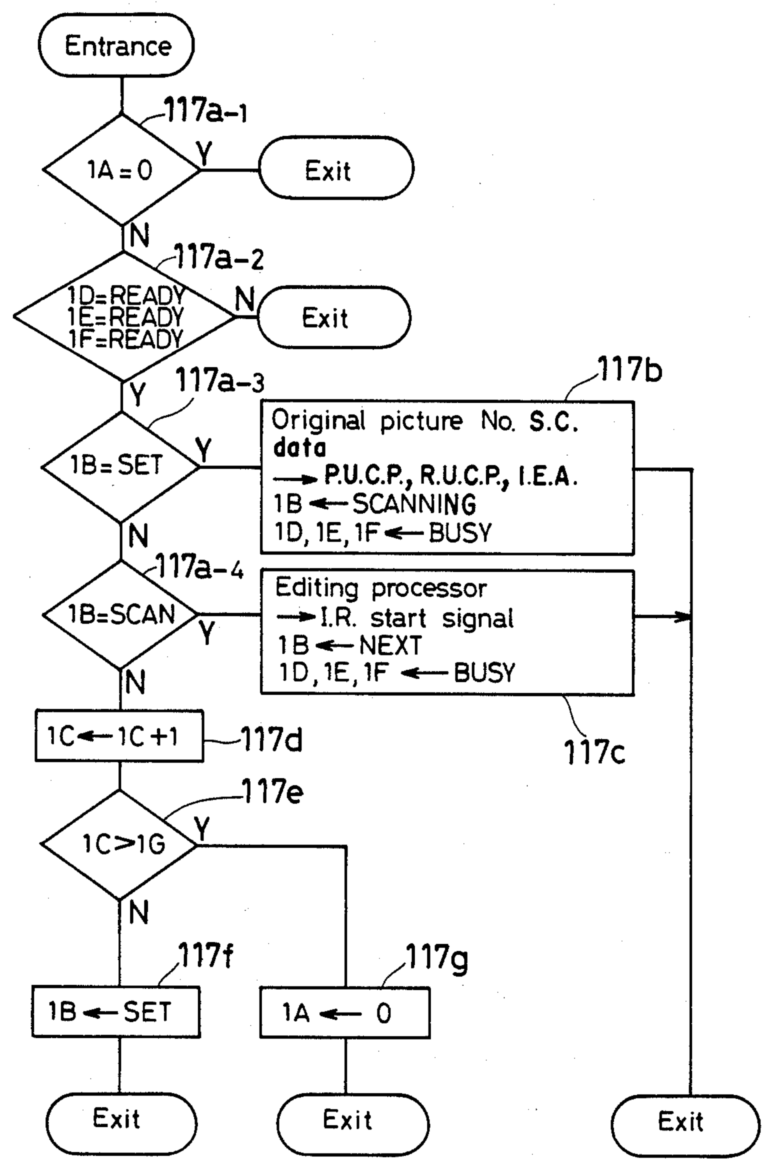

FIGS. 7(A)–7(D) show a flow chart of the operation of the master processor 1, in which FIG. 7(A) shows the main routine and FIG. 7(B),(C),(D) show the subroutines thereof.

When electric power is given to the master processor 1, the processor is put into the initial stage, that is, an image reproduction process command flag lA is made to be "0", while a P.U. control processor status flag 1D, an editing processor status flag 1E and an R.U. control processor status flag 1F are made to be "ready" respectively in a step 111.

In the initial stage, because the determinations (or results) of steps $112_{-1}$, $112_{-2}$, $112_{-3}$ and $112_{-4}$ are all "N", the operation of the master processor 1 proceeds to an image reproduction control sub-routine 117, of which detail is shown in FIG. 7(D).

Because the image reproduction process command flag 1A is "0" in the step 111, the result of a step $117_{a-1}$ becomes "Y", and the operation returns via an exit to the step $112_{-1}$.

When data are input from the keyboard $1_d$ or from the digitizer $1_a$, the result of the step $112_{-1}$ becomes "Y", and the operation proceeds to a keyboard/digitizer input processing sub-routine 113, of which detail is shown in FIG. 7(B). When the number of an original are input to the master processor 1, the result of a step $113_{b-1}$ becomes "Y". Then the scanning condition data corresponding to the original number are input to an internal memory of the master processor (when any other data are already memorized there, the stored data are restored to the main memory) from the main memory $1_c$ and they are displayed on the CRT display $1_b$ in a step $113_d$. Then the operation returns via an exit and the subroutine 117 to the step $112_{-1}$.

When color separation data are input to the master processor 1, the operation proceeds via the steps $112_{-1}$, a step $113_{b-2}$ of the sub-routine 113 to a process 113e, when the color separation data are input to the internal memory of the master processor 1. Then the operation returns via the exit and the sub-routine 117 to the step $112_{-1}$. Although the other scanning condition data are input to the master processor 1 in the same routine, the following mentions only the sub-routine 113.

When recording data are input to the master processor 1, because the result of a step $113_{b-3}$ becomes "Y", the recording data, namely recording start and stop points data, are input to the internal memory of the master processor 1, and the positions of reproduction images to be recorded on a photosensitive material are simulated on the CRT display $1_b$ in a step $113_f$.

When image editing data are input to the master processor 1, because the result of a step $113_{b-4}$ becomes "Y", the image editing data are input to the internal memory of the master processor 1, and are displayed on the CRT display $1_b$ in a step $113_g$.

When halftone dot selection data are input to the master processor 1, because the result of a step $113_{b-5}$ becomes "Y", the halftone dot selection data are input to the internal memory of the master processor 1, and are displayed on the CRT display $1_b$ in a step $113_h$.

The abovementioned data input processes are carried out for every original. In other words, the operation is repeated in the above routine until the data of all the originals are input to the intenal memory of the master processor 1.

When a number is input to the master processor 1, the result of a step $113_{b-6}$ becomes "Y", and in step **113*i*** the number is stored into a register lC as number data for indicating the first original to be processed. Likewise, the next number is stored into a register lG as number data for indicating the last original to be reproduced.

Thus the data requisite for reproducing images are input by an operator by means of the keyboard $1_d$ and the digitizer $1_a$ to the master processor 1.

By the way, when an already-recorded material is mounted on the drum 91, it must be withdrawn from the drum 91, and an unrecorded photosensitive material must be supplied to the drum 91 before a stop $113_{b-8}$ for starting the image reproduction process r said step $113_{b-1}$. In this embodiment, the work is performed by an operator. That is, when an operator orders the master processor 1 to withdraw the already-recorded material by means of the keyboard $1_d$, because the result of the step $113_{b-7}$ becomes "Y", a film-withdrawal signal is input to the R.U. control processor 3. When the material is withdrawn from the recording drum 91 by said film loader 95, the operation returns to the step $112_{-1}$. When an operator orders the master processor 1 to supply an unrecorded photosensitive material onto the recording drum 91 via the keyboard $1_d$, because the result of the step $113_{b-7}$ becomes "Y", film-supply signal is input to the R.U. control processor 3. When a photosensitive material is supplied onto the recording drum 91, the operation returns to the step $112_{-1}$.

When the image reproduction start order signal is input to the master processor 1 by an operator, because the result of a step $113_{b-8}$ becomes "Y", the image reproduction process command flag lA is made to be "1", a stage flag 1B is made to be "set", and the setup data are stored into the main memory in a step $113_k$. Then the operation goes out via an exit to an image reproduction process control sub-routine 117 as shown in FIG. 7(D).

Because the flag lA is made to be "1" in the step $113_k$, the result of the step $117_{a-1}$ becomes "N" to make the operation proceed to a step $117_{a-2}$. Then the operation proceeds to a step $117_{a-3}$ because all the status flags 1D, 1E and 1F are "ready" in the step 111. So the operation proceeds to a step $117_b$ because the stage flag 1B is "set" in the step $113_k$. In the step $117_b$, said registered original number data are read from the register 1C and the corresponding scanning condition data are output from the main memory to the P.U. control processor 2, R.U. control processor 3 and to the image editing processor 7. While not shown in FIG. 7(D), it is noted that in accordance with the invention, the halftone dot data are input to the halftone dot processor 8 according to said halftone dot selected data. After that the master processor 1 causes the stage flag 1B to be "scanning" and the status flags 1D, 1E and 1F to be "busy". The operation goes out via an exit to the step $112_{-1}$, proceeds to the steps $112_{-2}$, $112_{-3}$ and $112_{-4}$ successively and returns to the sub-routine 117. This time, the operation goes out via the step $117_{a-2}$ and an exit because all the status flags 1D, 1E and 1F are "busy". On the other hand, the subordinate processors which are given the abovementioned respective scanning condition data output the data to the implement circuits. For example, the P.U. and R.U. motor processors 4 and 9 make the respective motors (drums) revolve and move the heads to respective trimming (recording) start position. When the data setting work is finished, the subordinate processors send command request signals to the master processor 1. More precisely, when the P.U. control processor 2 finishes setting up the scanning condition data to the P.U. motor processor 4, color computation processor 5 and to the magnification ratio processor 6, and the input scanning head is moved to the trimming start point, the subordinate processors 4, 5 and 6 output command request signals respectively via the P.U. control processor 2 to the master processor 1. In this occasion, the operation proceeds to a command request processing sub-routine 114 because the result of the step $112_{-2}$ becomes "Y".

FIG. 7(C) shows the sub-routine 114, in which the master processor 1 deals with the command request signals from the P.U. control processor 2.

In this case, the results of steps $114_{b-1}$ and $114_{b-2}$ are both "N" because there are manual input from the control panel $2_a$ (mentioned in detail later). So the operation proceeds to a step $114_e$, in which the P.U. control processor status flag 1D is made to be "ready". Then the operation goes out via an exit to the subroutine 117. In this, the result of the step $117_{a-2}$ becomes "N" because the status flags 1E and 1F are still "busy", and then the operation goes out from the subroutine 117.

When the image editing processor 7 outputs a command request signal to the master processor 1 after setting up necessary data to the image editor 70, the result of the step $112_{-3}$ becomes "Y" and the status flag 1E is made to be "ready" in a step 115.

Similarly, when the R.U. control processor 8 and the R.U. motor processors set up necessary data to the corresponding implement circuits, and the recording head is moved to the recording start point, they output command request signals to the master processor 1. Consequently, the result of the step $112_{-4}$ becomes "Y" and the status flag 1F is made to be "ready".

Therefore in the sub-routine 117, the result of the step $117_{a-2}$ becomes "Y" because the status flags 1D, 1E and 1F are made to be "ready" in the steps 114 $114_e$), 115 and 116. Then the result of the step $117_{a-3}$ becomes "N" because the stage flag 1B is made to be "scanning" in the step $117_b$. And the result of the step $117_{a-4}$ becomes "Y" by the same reason to make the operation proceed to a step $117_c$.

In the step $117_c$, the image editing processor 7 outputs the image reproduction start signal via the image editor 70 to the P.U. motor controller 40, the color computer 50, the magnification converter 60, the halftone dot generator 80 and to the R.U. motor controller 90 in response to the stage flag 1B. On command of the start signal, the implement circuits 40, 50, 60, 80 and 90 begin to reproduce images.

In the step $117_c$, the stage flag 1B is made to be "next", and the status flags 1D, 1E and 1F are made to be "busy". In the subsequent routines, the operation circulates in the steps $112_{-1}$, $112_{-2}$, $112_{-3}$, $112_{-4}$, $117_{a-1}$ and $117_{a-2}$ until the image reproduction process is completed, in other words, until the P.U. control processor 2, the image editing processor 7 and the R.U. control processor 3 output command request signals to the master procesor 1 because the result of the step $117_{a-2}$ becomes "N".

When the image reproduction process of one original is finished, said subordinate processors output command request signals to the master processor 1. In this case, the status flags 1D, 1E and 1F are made to be "ready" in the steps $114_e$, 115 and 116 respectively because the results of the steps $112_{-2}$, $112_{-3}$ and $112_{-4}$ becomes "Y". While in the sub-routine 117, the result of the step $117_{a-2}$ becomes "Y" and the result of the steps $117_{a-3}$ and $117_{a-4}$ become "N" respectively because the stage flag 1B is already made to be "next". Then the original number is increased by one ($1C \leftarrow 1C+1$) in a step $117_d$ and the operation proceeds to a step $117_e$.

In the step $117_e$, the present original number lC is compared to the number lG of said last original. When $1C<1G$, the result of the step $117_e$ becomes "N" to make the stage flag 1B to be "set" in a step $117_f$. Therefore, the result of the step $117_{a-3}$ becomes "Y" in the next routine to set up the data of the next original to the subordinate processors in the step $117_b$. And in the further steps, the original is put into the image reproduction process. The above routine is repeated until the image reproduction process for the last original is completed.

When the image reproduction process for the last original is finished, the operation proceeds to a step $117_g$, when the image reproduction process is finished by making the flag lA to be "0".

By the way, scanning condition data of the succeeding original can be input to the master processor 1 while the present original is(are) put to the image reproduction process according to the image reproduction condition data thereof as mentioned below.

That is, the operation of the master processor 1 circulates in the steps $112_{-1}$, $112_{-2}$, $112_{-3}$, $112_{-4}$ and $117_{a-2}$ when it pursued the step $117_b$, $117_c$ or $117_f$, otherwise, the operation circulates in the steps $112_{-1}$, $112_{-2}$, $112_{-3}$, $112_{-4}$ and $117_{a-1}$ when it pursued the step $117_g$ as long as no command request signal is input from the subordinate processors. In other words, the master processor 1 is acceptable of the scanning condition data of the succeeding original by means of the keyboard $1_d$ and the digitizer $1_a$ all the time except for the case all the subordinate processors output command request signals for indicating the completion of a data-setup process of an original to the master processor 1.

When the data of the next original are input to the master processor 1, the data are set up to the internal memory thereof in the sub-routine 113 because the result of the step $112_{-1}$ becomes "Y". In short, the master processor 1 can control the image reproduction process in response to command request signals while receiving scanning condition data of the next original input via the keyboard $1_d$ and the digitizer $1_a$. In this, as the operation speed of the master processor 1 is much faster than the input speed of an operator, the operation of the master processor 1 can easily pursue the sub-routine 117 and the steps 114, 115 and 116 while the operator inputs data to the internal memory thereof.

Figure 8A:
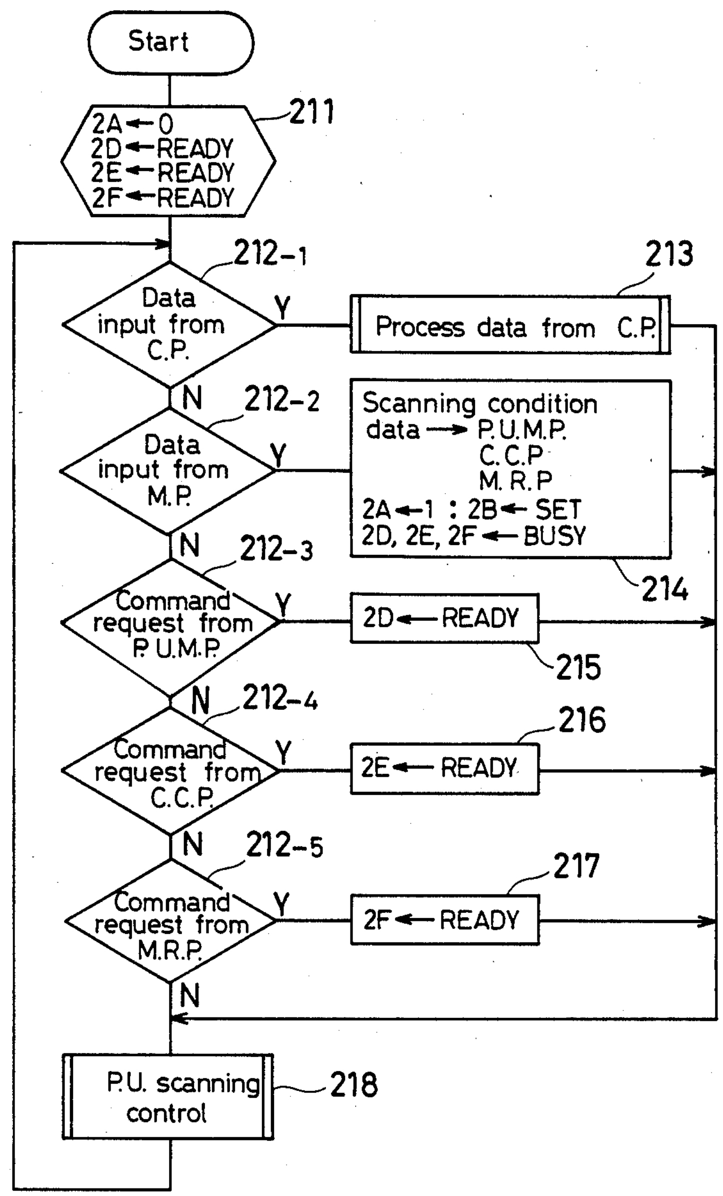

FIG. 8 shows a flow chart of the operation of the P.U. control processor 2 in which FIG. 8(A) shows the main routine, while FIG. 8(B),(C) show the sub-routines thereof.

The P.U. control processor 2 is put into the initial stage in step 211, when a process command flag 2A is made to be "0", a P.U. motor processor status flag 2D, a color computation processor status flag 2E and a magnification ratio processor status flag 2F are made to be "ready" respectively. In the initial stage, the results of the steps $212_{-1}$, $212_{-2}$, $212_{-3}$, $212_{-4}$ and $212_{-5}$ are all made to be "N", therefore, the operation of the P.U. control processor proceeds to a P.U. scanning control sub-routine 218.

Figure 8C:
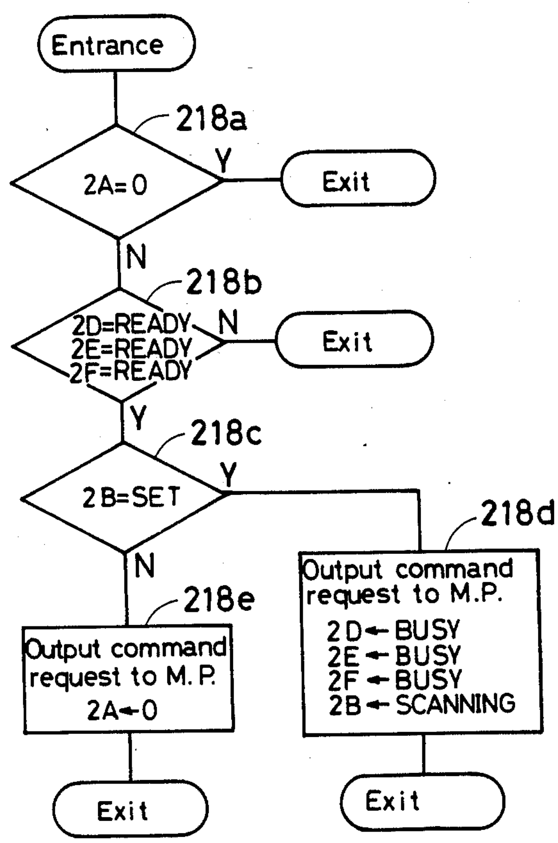

FIG. 8(C) shows the sub-routine 218, wherein the operation goes out from a step $218_a$ via an exit because the result of the step $218_a$ becomes "Y".

When no data are input from the control panel $2_a$, the operation proceeds to a step $212_{-2}$ because the result of a step $212_{-1}$ becomes "N" (a case in which data are input from the control panel is explained later).

When the data mentioned on the step $117_b$ are input from the master processor $1_a$ to the P.U. control processor 1, the operation proceeds to a step 214 because the result of step $212_{-2}$ becomes "Y". In the step 214, the P.U. control processor 2 receives the scanning condition data from the master processor 1 and then output them to the P.U. motor processor 4, the color computation processor 5 and to the magnification ratio processor 6. After that the P.U. control processor makes the process command flag 2A be "1", makes a stage flag 2B be "set", and makes the status flags 2D, 2E and 2F be "busy".

The operation proceeds to the sub-routine 21.8, when the result of a step $218_a$ becomes "N" because the flag 2A is "1", and the result of a step $218_b$ becomes "N" because the flags 2D, 2E and 2F are all "busy" Then the operation returns via an exit to the main routine.

In response to the data input from the P.U. control processor 2 in the step 214, the subordinate processors 4, 5 and 6 output command request signals to the P.U. control processor 2 when the data are set up thereto.

That is, when the command request signal is output from the P.U. motor processor 4, the result of the step 212$_{-3}$ becomes "Y" to make the status flag 2D be "ready" in a step 215. When the command request signal is output from the color computation processor 5, the result of the step 212$_{-4}$ becomes "Y" to make the status flag 2E be "ready" in a step 216. When the command request signal is output from the magnification ratio processor 6, the result of the step 212$_{-5}$ becomes "Y" to make the status flag 2F be "ready" in a step 217.

The operation proceeds to the sub-routine 218 again, when the result of a step 218$_{-b}$ becomes "Y" because the status flags 2D, 2E and 2F are "ready". Then the result of a step 218$_c$ becomes "Y" because the status flag 2B is "set". The operation proceeds to a step 218$_d$, when the P.U. control processor 2 outputs a command request signal to the master processor 1 (mentioned in the process 112$_{-2}$ based on FIG. 7(A)), and the status flags 2D, 2E and 2F are all made to be "busy", while the stage flag 2B is made to be "scanning".

When all the subordinate processors output the command request signals to the master processor 1, said image reproduction start signal is input via the image editing processor 7 and the image editor 70 to all the implement circuits to start the image reproduction process as mentioned in the step 117$_c$ of FIG. 7(D).

When the image reproduction (scanning) process is completed, the P.U. motor processor 4, the color computation processor 5 and the magnification ratio processor 6 output command request signals to the master processor 1 respectively. Therefore the results of the steps 212$_{-1}$, 212$_{-4}$ and 212$_{-5}$ become "Y" respectively to make the status flags 2D, 2E and 2F be "ready". Then the result of the step 218$_b$ becomes "Y" and the result of the step 218$_c$ becomes "N" because the stage flag 2B is already made to be "scanning" in the step 218$_d$. Consequently, the P.U. control processor 2 outputs a command request signal to the master processor 1. After that the status flag 2A is made to be "0".

Then the P.U. control processor 2 becomes acceptable of the next command from the master processor 1 again pursuing the steps 212$_{-1}$ to 212$_{-5}$ and 218$_a$.

The following describes a case wherein original data are input from the control panel 2$_a$ to the P.U. control processor 2.

When image reproduction condition data are input from the control panel 2$_a$, the operation of the P.U. control processor 2 proceeds to an input data processing sub-routine 213 because the result of the step 212$_{-1}$ becomes "Y".

FIG. 8(B) shows the detail of the sub-routine 213.

When image reproduction condition data are input to the P.U. control processor 2, the operation proceeds to a step 213$_b$ because the result of a step 213$_{a-1}$ becomes "Y". In the step 213$_b$, the data are registered into an internal memory of the P.U. control processor 2 and are output to the color computation processor 5, completion of which procedure is indicated on the control panel 2$_a$.

When standard scanning condition data input designation is made by an operation, the operation of the P.U. control processor 2 proceeds to a step 213$_c$ because the result of a step 213$_{a-2}$ becomes "Y". In the step 213$_c$, the P.U. control processor 2 outputs a command request signal to the master processor 1, and receives the data. After that, the data are input to the color computation processor 5 and completion of the above process is indicated on the control panel 2$_a$. This step corresponds to the step 114$_d$ of the master processor 1.

The input scanning head 43 can be moved under key control. That is, when a head moving switch is pushed on by an operator, a head moving signal is input to the P.U. control processor 2, and the operation proceeds to a step 213$_d$ because the result of a step 213$_{a-3}$ becomes "Y". In the step 213$_d$, the P.U. control processor 2 outputs a head moving command.

An operator pushes keys when the scanning head 43 comes to the trimming start and the end points to output a trimming start and a stop point signals to the P.U. control processor 2. Therefore the operation proceeds to a step 213$_e$ because the result of the step 213$_{a-4}$ becomes "Y". In the step 213$_e$, the P.U. motor control processor 2 sends a point data input signal to the P.U. motor processor 4, which receives the trimming start and stop point designation data, and outputs them to the internal memory of the P.U. control processor 2.

When an RGB/YMCK data display signal is input to the P.U. control procesor 2, the operation proceeds to a step 213$_f$ because the result of the step 213$_{a-5}$ becomes "Y". In the step 213$_f$, the P.U. control procesor 2 receives the color separation image signals Y, M, C and K which are converted from color component signals R, G and B in the color computer 50 via the color computation processor 5 and displays them on the control panel 2$_a$. When an operator pushes a scanning condition data saving key, a scanning condition data saving signal is output from the P.U. control procesor 2. Then the operation proceeds to a step 213$_g$ because the result of step 213$_{a-6}$ becomes "Y". In the step 213$_g$, the P.U. control processor 2 outputs an image reproduction condition data saving signal to the master proceso 1 and after that sends the data to the same.

This process corresponds to the step 114$_c$ of the master processor 1.

Figure 9:
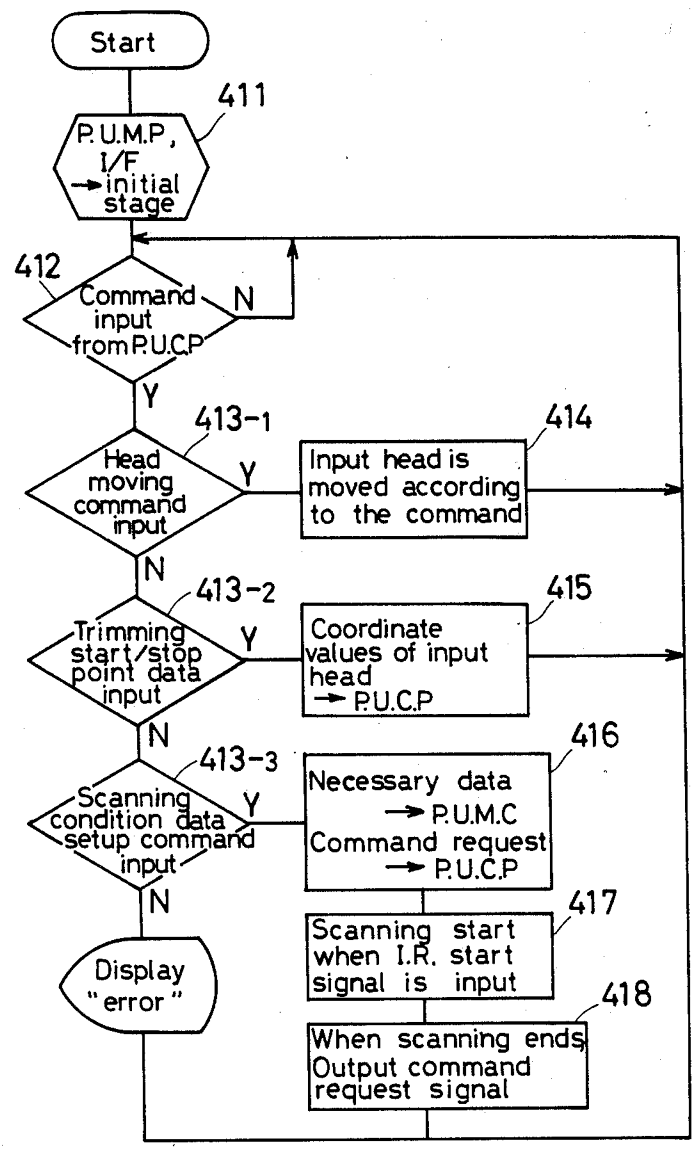
FIG. 9 shows a flow chart of the operation of a P.U. motor processor.

FIG. 9 shows a flow chart of the operation of the P.U. motor processor 4. The P.U. motor processor 4, its interface and the P.U. motor controller are put into the initial stage in a step 411.

The P.U. motor processor 4 becomes ready for receiving a command in a step 412.

When an operation command signal is input from the P.U. control processor 2 to the P.U. motor processor 4, the result of the step 412 becomes "Y".

When the head moving key is pushed and the process of the step 213$_d$ is put into practice the operation of the P.U. motor processor 4 proceeds to a step 414 because the result of a step 413$_{-1}$ becomes "Y". In the step 414, the input scanning head is shifted in the subscanning direction.

When the trimming start and end points data input key is pushed and the process of the step 213$_e$s put into practice, the operation proceeds to a step 415 because the result of a step 413$_{-2}$ becomes "Y". In the step 415, the trimming start and end points data are input to the P.U. control processor 2.

When the image reproduction condition data are input to the P.U. control processor 4 and the process of the step 214 is put into practice, the operation proceeds to a step 416 because the result of a step 413$_{-3}$ becomes "Y". In the step 416, necessary data are input to the P.U. motor processor 4 and to the P.U. motor controller 40. Then the P.U. motor processor 4 moves the input scanning drum and the input scanning head to the scanning start point. When the P.U. motor controller becomes to be capable of performing a scanning work, it outputs a command request signal to the P.U. control processor 2. This signal makes the result of the step $212_{-3}$ be "Y".

When said image reproduction start signal is input from the image editor 70 in a step 417, the P.U. motor processor 4 begins to scan the present original. When the scanning process is finished in a step 418, it outputs a command request signal to the P.U. control processor 2. This signal makes the result of the step $212_{-3}$ be "Y".

Figure 10:
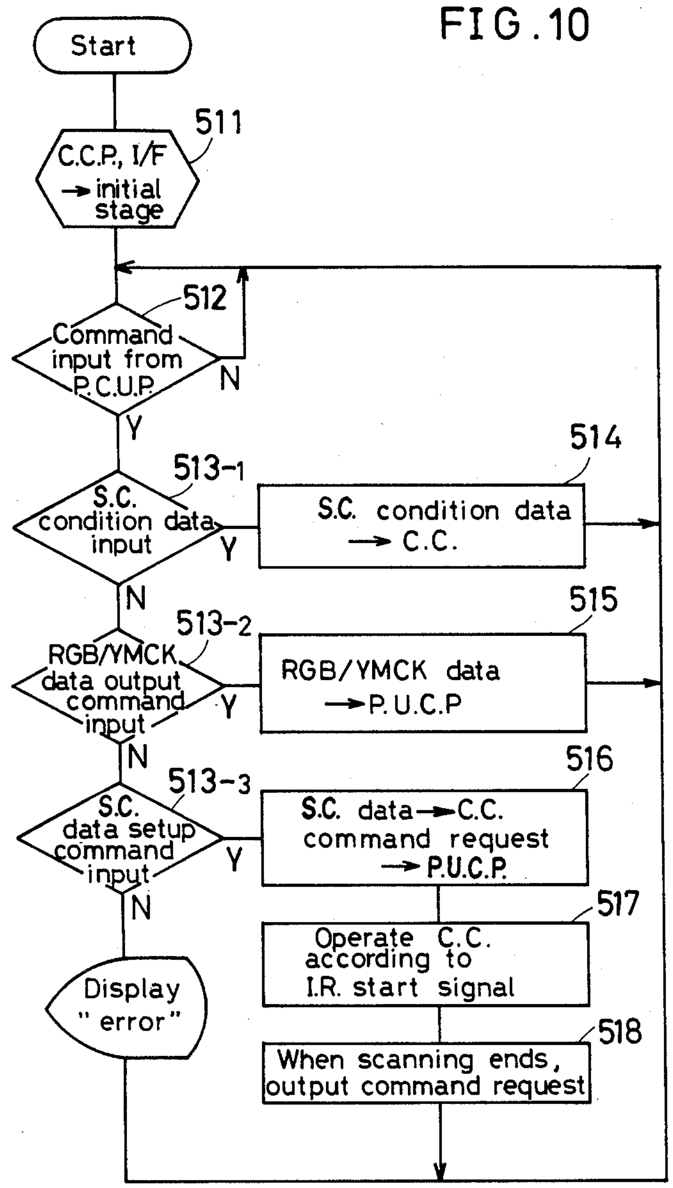
FIG. 10 shows a flow chart of the operation of a color computation processor.

FIG. 10 shows a flow chart of the operation of the color computation processor 5. The color computation processor 5, its interface and the color computer 50 are put into the initial stage in a step 511.

The color computation processor 5 is ready for a command in a step 512.

The commands of the steps $213_b$ and $213_c$ make the results of steps 512 and $513_{-1}$ be "Y" respectively. So the operation proceeds to a step 514, when the P.U. motor processor 4 receives the scanning condition data, and output the data to the color computer 50. The computed resultant data Y, M, C and K of the color computer 50 are input to the P.U. control processor 2 to be used for a simulation.

The command of the step $213_f$ makes the results of steps 512 and $513_{-2}$ be "Y", so the operation proceeds to a step 515, when the P.U. control processor sends color component data R, G and B and color separation data .Y. M, C and K to the P.U. control processor 2.

The command of the step 214 makes the result $513_{-3}$ be "Y". So the operation proceeds to a step 516, when the P.U. motor processor 4 receives the scanning condition data and output them to the color computer 50. After that, it outputs a command request signal to the P.U. control processor 2. This signal makes the result of the step $212_{-4}$ be "Y". In a step 517, the operation of the color computer 50 begins when the image reproduction start pulse is input from the image editor 70. In a step 518, when the scanning process is finished, the P.U. motor processor 4 outputs an order demand signal to the P.U. control processor 2. This signal makes the result of the step $212_{-4}$ be "Y".

Figure 11:
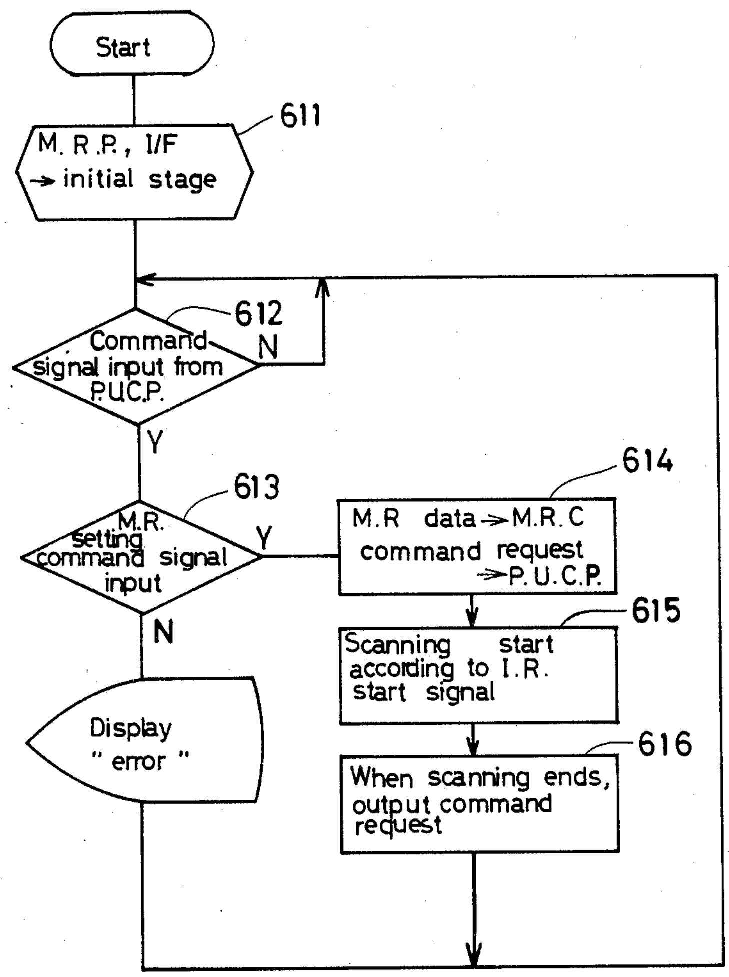
FIG. 11 shows a flow chart of the operation of a magnification ratio processor.

FIG. 11 shows a flow chart of the operation of the magnification ratio processor 6. The magnification ratio processor 6, its interface and the magnification ratio converter 60 are put into the initial stage in a step 611. The magnification ratio processor is ready for receiving a command from the P.U. control processor 2 i the step 611.

The command of the step 214 makes the results of steps 612 and 613 be "Y". So the operation of the magnification ratio processor 6 proceeds to a step 614, when it receives the magnification ratio data, input the data to the magnification ratio converter 60 and output a command request signal to the P.U. control processor 2. This signal makes the result of the step $212_{-5}$ be "Y". In a step 615, the operation of the magnification converter 60 is put into practice according to the image reproduction start signal from the image editor 70. When the operation is stopped in a step 616, the magnification ratio processor 6 outputs a command request signal to the P.U. control processor 2. This signal makes the result of the step $215_{-5}$ be "Y".

Figure 12:
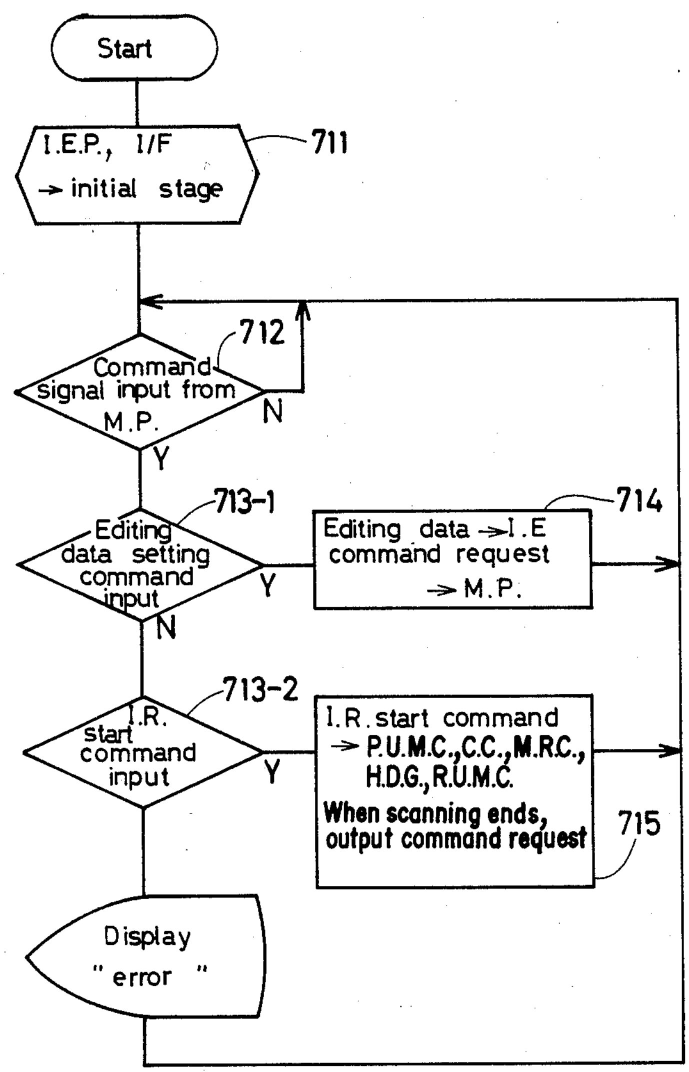
FIG. 12 shows a flow chart of the operation of an image editing processor.

FIG. 12 shows a flow chart of the operation of the image editing processor 7. In a step 711, the image editing processor, its interface and the image editor 70 are put into the initial stage.

The image editing processor 7 is ready for receiving a command from the master processor 1 in a step 712. The command of the step $117_b$ makes the results of steps 712 and $713_{-1}$ be "Y". So the operation of the image editing processor 7 proceeds to a step 714, when it receives the image editing data, it inputs them to the image editor 70 and outputs a command request signal to the master processor 1. This signal makes the result of the step $112_{-3}$ be "Y".

The command of the step $117_c$ makes the result of a step $713_{-2}$ be "Y". So the operation proceeds to a step 715, when the image editing processor 7 outputs the signal to the P.U. motor controller 40, the color computer 50, the magnification ratio converter 60, the halftone dot generator 80 and to the R.U. motor control circuit 90. When the operation is stopped, it outputs a command request signal, which makes the result of the step $112_{-3}$ be "Y".

Figure 13A:
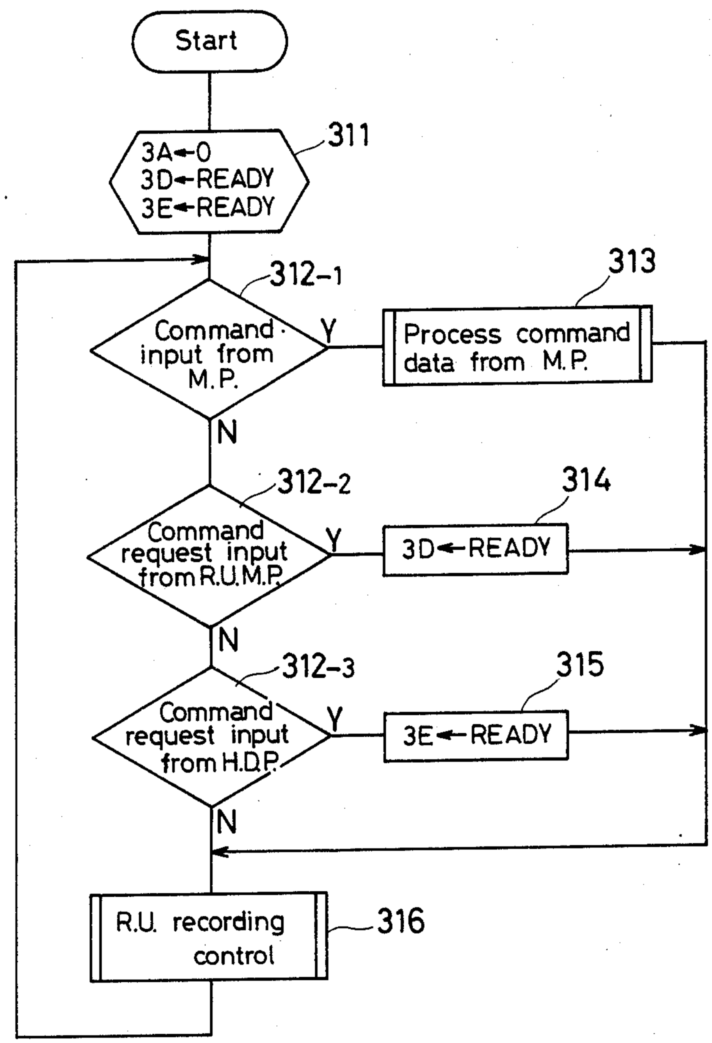
FIGS. 13(A)–(C) show a flow chart of the operation of an R.U. control processor.
Figure 13:
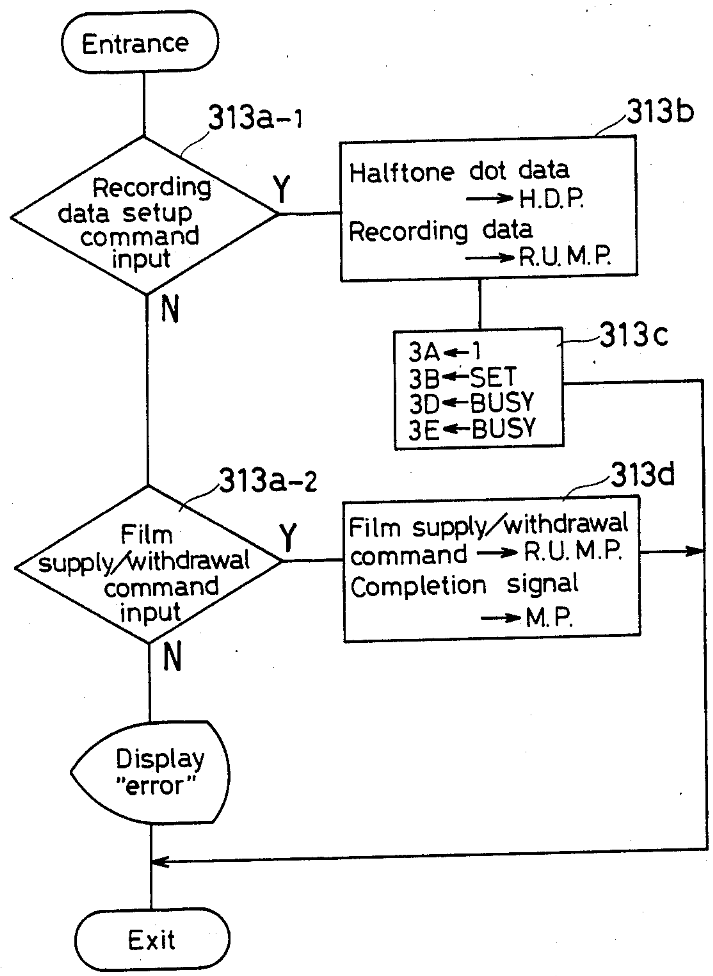
Figure 13:
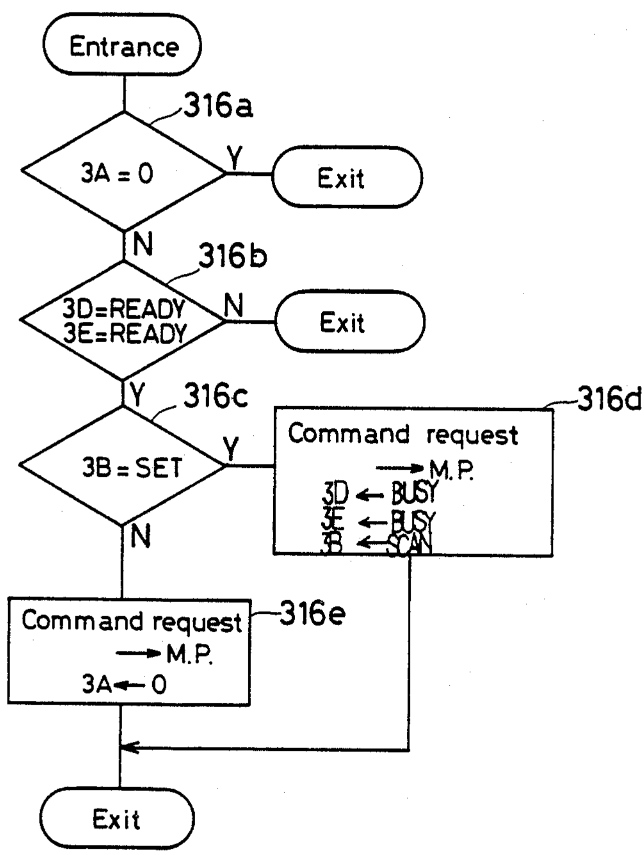

FIG. 13 shows a flow chart of the operation of the R.U. control procesor 3, wherein FIG. 13(A) shows the main routine while FIG. 13(B),(C) show the sub-routines. In a step 311, the R.U. control processor is put into the initial stage, a proces command flag 3A is made to be "0", and the R.U. motor processor status flag 3D and the halftone dot processor status flag 3E are made to be "ready" respectively.

The operation of the R.U. control processor 3 proceeds to a R.U. recording control sub-routine 316 in the initial stage because the result of steps $312_{-1}$, $312_{-2}$ and $312_{-3}$ are all "N". In the sub-routine 316 shown in FIG. 13(C), the result of a step $316_a$ becomes "Y" because the flag 3A remains "0". So the R.U. control processor 3 is to be in a wait condition.

When the commands of the steps $113_j$ and $117_b$ are input from the master processor 1 to the R.U. control processor 3, the operation proceeds to a command data processing sub-routine 313 because the result of the step $312_{-1}$ becomes "Y".

FIG. 13(B) shows the sub-routine 313 for processing the commands from the master processor 1.

The command of the step $117_b$ makes the result of a step $313_{a-1}$ be "Y". So the operation proceeds to a process $313_b$, when the R.U. control processor 3 receives halftone dot data from the master processor 1 and sends them to the halftone dot processor 8. When the data are as same as the previous data, the process is not performed. Then the R.U. control processor 3 receives recording data and sends them to the R.U. motor processor 9.

In a step $313_c$, the process command flag 3A is made to be "1", a stage flag 3B is made to be "set", and status flags 3D and 3E are made to be "busy" respectively. Then the operation goes out from the sub-routine 313 via an exit to the sub-routine 316. The result of the step $316_a$ becomes "N" because the flag 3A is "1" in the step $313_c$. The result of a step $316_b$ becomes "N" because the status flags 3D and 3E are both "busy" in the step $313_c$. Then the operation goes out from the sub-routine 316 and circulates in the step $312_{-1}$ to $312_{-3}$, $316_a$ and $316_b$, when the R.U. control processor 3 is in a wait condition.

After revolving the recording drum 91 and moving the recording head 93 to the recording start point in accordance with the recording data, the R.U. motor processor 9 outputs a command request signal to the R.U. control processor 3. Then the operation proceeds to a step 314 because the result of the step $312_{-2}$ becomes "Y". In the step 314, the status flag 3D is made to be "ready".

After setting up halftone dot data to the halftone dot generator 80, the halftone dot processor 8 outputs a command request signal to the R.U. control processor 3. Then the operation proceeds to a step 315 because the result of a step $312_{-3}$ becomes "Y". In the step 315, the status flag 3E is made to be "ready".

When the flags 3D and 3E are made to be "ready", the operation proceeds to a step $316_c$ because the result of the step $316_b$ becomes "Y". The result of the step $316_c$ becomes "Y" because the flag 3B is "set" in the step $313_c$. So the operation proceeds to a step $316_d$, when the R.U. control processor outputs a command request signal to the master processor 1. This signal makes the result of the step $112_{-4}$ be "Y". Furthermore in the step $316_d$, the status flags 3D and 3E are made to be "busy" respectively, and the stage flag 3B is made to be "scanning".

Then the operation circulates in the steps $312_{-1}$ to $312_{-3}$, $316_a$ and $316_b$ in a wait the master processor 1 receives the order demand signals from all the subordinate processors, the process of the step $117_c$ is put into practice, that is, the image reproduction start signal is output via the image editing processor 7 from the image editor 70 to put the whole system into the image reproduction process.

When the image reproduction process is completed, the R.U. motor processor 9 and the halftone dot processor 8 output command request signals respectively to the R.U. control processor 3. The signals make the results of the steps $312_{-2}$ and $312_{-3}$ be "Y" respectively. Then the status flags 3D and 3E are made to be "ready" in the steps 314 and 315. Therefore the result of the step $316_b$ becomes "Y". The result of the step $316_c$ becomes "N" because the stage flag 3B is "scanning" in the process $316_d$. So the operation proceeds to a step $316_e$, when the R.U. control processor 3 outputs a command request-signal to the master processor 1. This signal makes the result of the step $112_{-4}$ be "Y". Furthermore in the step $316_e$, the flag 3A is made to be "0", and the operation circulates in the steps $312_{-1}$ to $312_{-3}$ and $316_a$ in a wait condition. This wait condition is for reproducing the next image.

The command of the step $113_j$ of the master processor 1 makes the result of the steps $312_{-1}$ and $313_{a-2}$ be "Y" successively. Then the operation proceeds to a step $313_d$, when the R.U. control processor 3 outputs a film supply/withdrawal signal to the R.U. motor procesor 9. When the R.U. control processor 3 receives a film supply/withdrawal completion signal from the R.U. motor processor 9, it outputs a completion signal to the master processor 1. This signal completes the step $113_j$.

Figure 14:
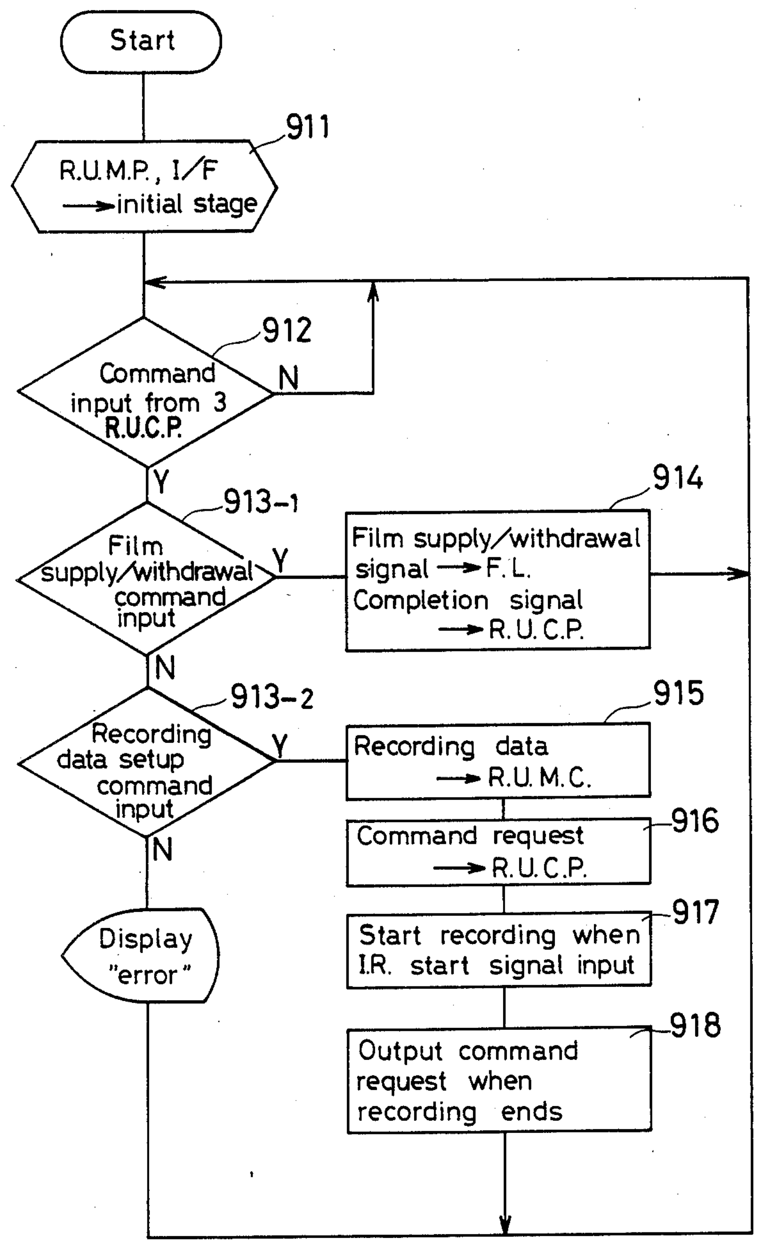
FIG. 14 shows a flow chart of the operation of an R.U. motor processor.

FIG. 14 shows a flow chart of the operation of the R.U. motor processor 9. In a process 911, the R.U. motor procesor 9, its interface and the R.U. motor controller 90 are put into the initial stage.

The R.U. motor processor 90 is ready for receiving a command from the R.U. control processor 3.

The command of the step $313_d$ makes the results of steps 912 and $913_{-1}$ be "Y" successively. So the operation of the R.U. motor processor 9 proceeds to a step 914, when the R.U. motor processor outputs the film supply/withdrawal command to the film loader 95. When the film supply/withdrawal completion signal is input from the film loader 95, the R.U. motor processor 9 sends the signal to the R.U. control processor 3. This signal completes the step $313_d$.

The command of the step $313_b$ makes the result s of the step 912 and a step $913_{-2}$ be "Y". So the operation proceeds to a step 915, when the recording data (data of the recording start and stop points and the sub-scanning speed etc.) are set up to the R.U. motor controller 90. The R.U. motor controller 90 revolves the recording drum 91 and moves the recording head 93 to the recording start point, and after that it outputs a command request signal to the R.U. control processor 3 in a step 916. This signal makes the result of the step $312_{-2}$ be "Y". In a step 917, the R.U. motor processor begins to record a reproduction image in accordance with the image reproduction start signal being output in the step $117_c$. When the recording process is finished, at the 918 the R.U. motor processor 9 outputs a command request pulse to the R.U. motor control processor 3. This signal makes the result of the step $312_{-2}$ be "Y". Then the operation of the R.U. motor processor enters into a wait condition in the step 912.

Figure 15:
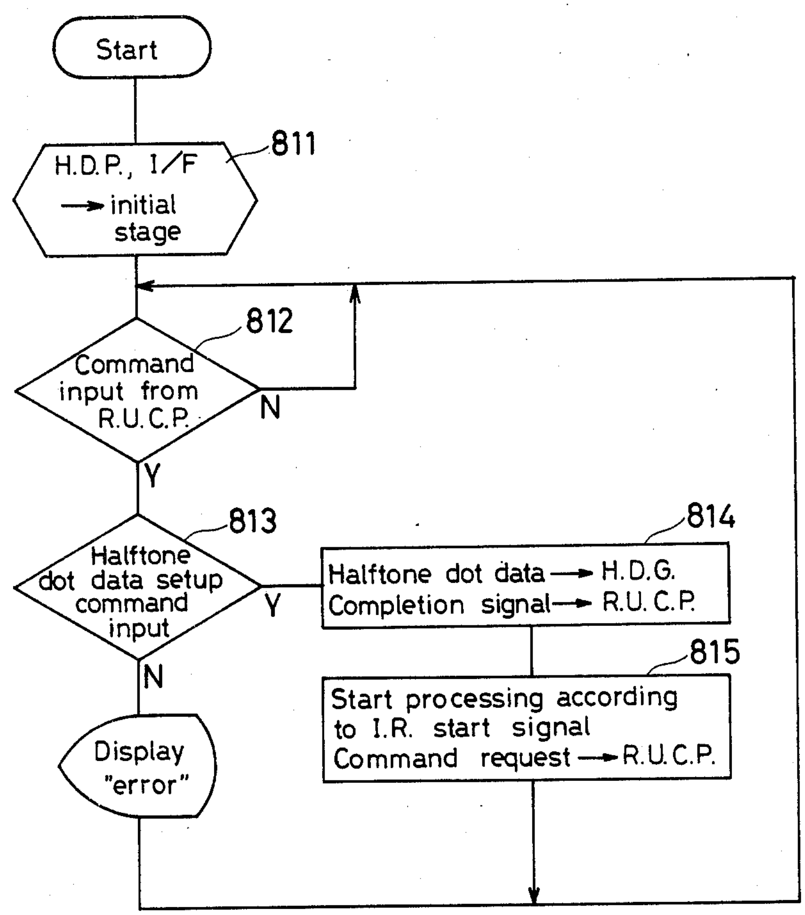
FIG. 15 shows a flow chart of the operation of a halftone dot processor.

FIG. 15 shows a flow chart of the operation of the halftone dot processor 8. In a step 811, the halftone dot processor 8, its interface and the halftone dot generator 80 are put into the initial stage. The halftone dot processor 8 is ready for receiving a command from the R.U. control processor 3.

The command of the step $313_b$ makes the results of steps 812 and 813 be "Y" successively. So the operation of the halftone dot processor 8 proceeds to a step 814, when the halftone dot processor 8 receives the halftone dot data and set up them to the halftone dot generator 80. After completing the data setup work, the halftone dot processor 8 outputs a command request signal to the R.U. control processor 3. This signal makes the result of the step $312_{-3}$ be "Y". Then the operation proceeds to a step 815, when the halftone dot processor 8 begins to control the halftone dot generator 80 in accordance with the image reproduction start signal being output from the image editor 70 in the step $117_c$.

The halftone dot generator 80 receives an image reproduction end signal from the image editor 70 and outputs a command request signal to the R.U. control processor 3. This signal makes the result of the step $312_{-3}$ be "Y". Then the operation of the halftone dot processor 8 is put into a wait condition.

The operation of the system of this invention is as the above when being based on the flow charts of FIG. 7 to FIG. 15.

Incidentally, each of the flow charts contains a step of displaying an error sign, however the error sign can also be sent back to respective superior processors.

Figure 16:
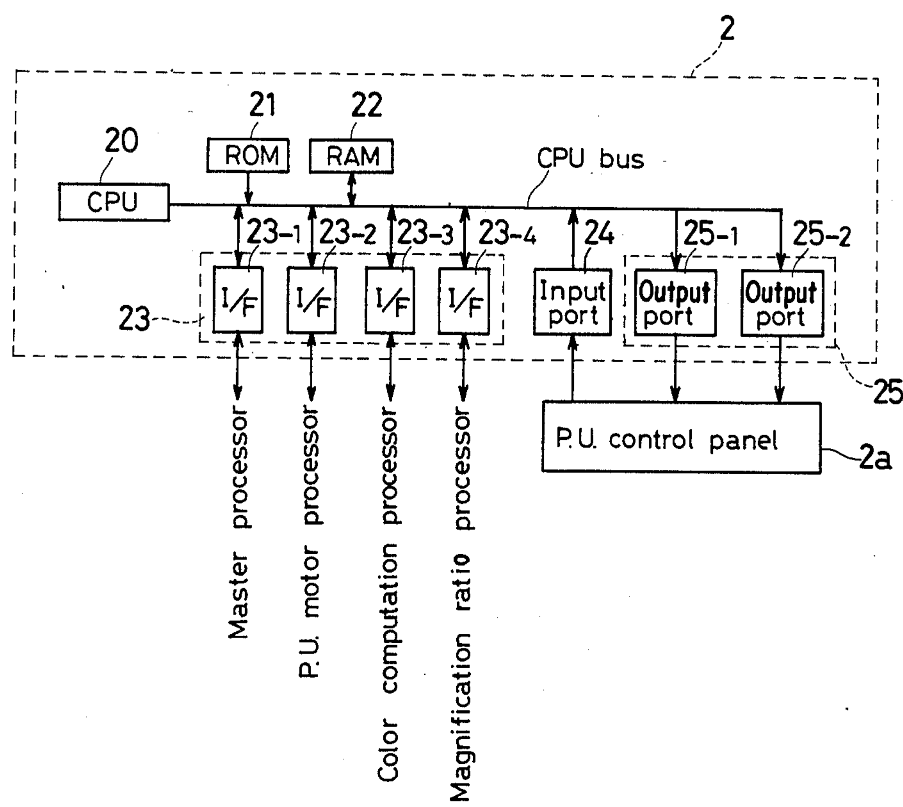
FIG. 16 shows a P.U. control processor.

FIG. 16 shows the arrangement for data transfer to the P.U. control processor 2. The P.U. control processor 2 is composed of a CPU 20, a ROM 21, a RAM 22, an interface 23, an input port 24 and an output port 25.

The P.U. control processor 2 is connected to the master processor 1, the P.U. control panel $2_a$, the P.U. motor processor 4, the color computation processor 5 and to the magnification ratio processor 6.

The ROM 21 is informed with a program data corresponding to the flow chart shown in FIG. 8. While the internal memory of the CPU 20 or a portion of the RAM 22 registers the data of the flags 2A, 2B, 2D, 2E and 2F. Data input from the P.U. control panel $2_a$, the master processor 1, P.U. motor processor 2, color computation procesor 5, and the magnification ratio processor 6 are stored into the RAM 22.

The interface 23 interfaces the P.U. control processor 2 and the other processors through separate interfaces $23_{-1}$. . . $23_{-4}$. The input port 24 and the output port $25_{-1}$ are for managing key input from the P.U. control panel $2_a$. The output port $25_{-2}$ is for sending data to the display of the P.U. control panel $2_a$. The operations of those are explained on FIG. 8.

Some of the other processors has their own interface and input and output ports, of which functions are as same as those of the P.U. control processor 2. They are recapitulated in Table 1.

As can be understood from Table 1, every processor has its own CPU, ROM and RAM, however, some of the processors have respective superior and subordinate processors, an input port and an output port (the others do not).

Although the above embodiment comprises the interfacing processors, i.e. the P.U. control processor 2 and the R.U. control processor 3, they can also be eliminated to directly connect the master processor 1 to the subordinate processors like the image editing processor in this embodiment.

As is mentioned above, in the system of this invention, data requisite for reproducing images are once stored into the main memory, and certain of the data corresponding to a designated original are automatically read and set up to the implement circuits under the control of the processors to be used for the scanning process, and this process is carried out for the subsequent originals. Therefore, the system of this invention is free from manual one-by-one data setting procedure, which fact leads to increasing the processing speed of reproducing color separation images of plural originals.

TABLE 1

| | CPU | ROM | RAM | Superior processor No. I/F | Subordinate processor(s) No(s). I/F | Input and Output ports |
|---|---|---|---|---|---|---|
| Master processor 1 | O | O | O | X | 2 | Digitizer $1_a$ |
| | | | | | 3 | CRT display $1_b$ |
| | | | | | 7 | Disc memory $1_c$ |
| | | | | | | Key board $1_d$ |
| P.U. control processor 2 | O | O | O | 1 | 4<br>5<br>6 | P.U. control panel $2_a$ |
| R.U. control processor 3 | O | O | O | 1 | 8<br>9 | X |
| P.U. motor processor 4 | O | O | O | 2 | X | P.U. motor controller 40 |
| Color computation processor 5 | O | O | O | 2 | X | Color Computer 50 |
| Magnification ratio processor 6 | O | O | O | 2 | X | Magnification ratio converter 60 |
| Image editing processor 7 | O | O | O | 1 | X | Image editor 70 |
| Halftone dot processor 8 | O | O | O | 3 | X | Halftone dot generator 80 |
| R.U. motor processor 9 | O | O | O | 3 | X | R.U. motor controller 90<br>Film loader 95 |

Note:
O: The processor shown in the left most column has the devices or are connected to the devices listed in the top most row of the Table.
X: The processor shown in the left most column doesn't have the devices or are not connected to the devices listed in the top most row of the Table.

We claim:

1. An image reproducing system in which image data obtained by scanning an original are processed and then used for causing a recording beam to record a reproduction image on a photosensitive material, comprising:

(a) a main processor for controlling programmable subordinate processors in order to record a plurality of reproduction images of plural originals mounted on an input scanning drum; and (b) programmable subordinate processors, respectively programmed for directly controlling, under the control of the main processor, a plurality of respective implement circuits, at least some of which are operable for carrying out respective processes on the image data.

2. An image reproducing system as recited in claim 1, in which the main processor comprises a master processor and mediate processors which interface between the master processor and the subordinate processors.

3. An image reproducing system as recited in claim 2, wherein said mediate processors include a pickup unit control processor for interfacing with selected ones of said programmable subordinate processors, said pickup unit control processor including:

a data distributing means for distributing scanning condition data to said selected programmable subordinate processors, said scanning condition data to be supplied by said selected programmable subordinate processors to corresponding ones of said implement circuits, and a process completion signal output means for outputting a process completion signal to the master processor when said selected programmable subordinate processors interfacing with said pickup unit control processor complete a process of supplying said scanning condition data to the corresponding ones of said implement circuits or when an image reproduction process for an original is completed.

4. An image reproducing system as recited in claim 2, wherein the mediate processors include a recording unit control processor for interfacing with a first subset of said programmable subordinate processors, said recording unit control processor including:

a data distributing means for distributing scanning condition data to said first subset of programmable subordinate processors, said scanning condition data to be respectively supplied by said first subset of programmable subordinate processors to a corresponding subset of said implement circuits; and a process completion signal output means for outputting a process completion signal to the ®mast®r processor when said programmable subordinate processors of said first subset interfacing with said recording unit control processor complete a process of supplying said scanning condition data to the corresponding subset of said implement circuits or when an image reproduction process for an original is completed.

5. An image reproducing system as recited in claim 1, in which the subordinate processors comprise:

(a) a pickup unit motor processor for controlling a pickup unit motor controller which controls a motor coaxially connected to an input scanning drum and a motor for moving an input scanning head along a feed screw;

(b) a color computation processor for controlling a color computer which converts color component signals R, G and B produced by the input scanning head into corresponding color separation signals Y, M, C and K representing the reproduction images;

(c) a magnification ratio processor for controlling a magnification ratio converter which carries out magnification conversion on the color separation signals Y, M, C and K output from the color computer;

(d) an image editing processor for controlling an image editor which designates at least one position on at least one of the images represented by the color separation signal Y, M, C and K to undergo at least one of a plurality of image editing operations including a tint laying operation, a bordering operation and a tint laying masking operation;

(e) a halftone dot processor for controlling a halftone dot generator which generates halftone dot signals in accordance with the color separation signals Y, M, C and K; and (f) a recording unit motor processor for controlling a recording unit motor controller which controls a motor coaxially connected to a recording drum and a motor for moving a recording head along a feed screw;

(g) said pickup unit motor controller, said color computer, said magnification ratio converter, said image editor, said halftone dot generator and said recording unit motor controller forming said implement circuits.

6. An image reproducing system as recited in claim 5, in which the subordinate processors output respective process completion signals to the main processor upon completion of a process of supplying data to corresponding ones of said implement circuits associated therewith or when an image reproduction process for an original is completed.

7. An image reproducing system as recited in claim 5, in which the image editing processor outputs an image reproduction start signal to all the implement circuits when the image editing processor receives an image reproduction start designation signal from the main processor.

8. An image reproducing system as recited in claim 1, including means for accepting input of scanning condition data for one original while the system is reproducing an image of another original.

9. An image reproducing system as recited in claim 1, wherein said implement circuits comprise pickup unit motor controller means, color computer means, magnification ratio converter means, image editor means, halftone dot generator means, recording unit motor controller means and film loader means.

10. An image reproducing system as recited in claim I, wherein said subordinate processors comprise pickup unit motor processor means, color computation processor means, magnification ratio processor means, image editing processor means, halftone dot processor means and recording unit motor processor means, each connected to and controlled by said main processor, and wherein said implement circuits comprise:

pickup unit motor controller means connected to and controlled by said pickup unit motor processor means for controlling motor means connected to an input scanning drum and to an input scanning head for moving the scanning head, color computer means connected to and controlled by said color computation processor means for converting color component signals R, G and B produced by the input scanning head into corresponding color separation signals Y, M, C and K representing the reproducing images;

magnification ratio converter means connected to and controlled by said magnification ratio processor means for performing a magnification conversion operation on the color separation signals output from the color computer means;

image editor means connected to and controlled by said image editing processor means for designating at least one position on at least one of the images represented by the color separation signals to undergo at least one of a plurality of image editing operations;

halftone dot generator means connected to and controlled by said halftone dot processor means for generating halftone dot signals n accordance with the color separation signals; and recording unit motor controller means connected to and controlled by said recording unit motor processor means for controlling further motor means connected to an output recording drum and to a recording head.

11. An image reproducing system as recited in claim 10, further comprising film loader means connected to and controlled by said recording unit motor processor means for loading film to be recorded by the recording head.

12. An image reproducing system as recited in claim 1, further comprising direct communication links for providing direct communication between said main processor and said programmable subordinate processors.

13. An image reproducting system as recited in claim 1 wherein said implement circuits include first means for controlling color, second means for controlling magnification ratio and third means for controlling halftone dot arrangement for the reproduction image.

14. An image reproducing system in which image data obtained by scanning an original are processed and then used for causing a recording beam to record a reproduction image on a photosensitive material, comprising:

(a) a main processor for controlling programmable subordinate processors in order to record a plurality of reproduction images of plural originals mounted on an input scanning drum; and (b) programmable subordinate processors, respectively programmed for directly controlling, under the control of the main processor, a plurality of respective implement circuits which carry out respective processes on the image data;

(c) said main processor comprising a master processor and mediate processors which interface between the master processor and the subordinate processor;

(d) said mediate processors comprising:

(1) a pickup unit control processor which interfaces between (i) the master processor and (ii) subordinate processors comprising a pickup unit motor processor, a color computation processor, and a magnification ratio processor; and (2) a recording unit control processor which interfaces between (i) the master processor and (ii) subordinate processors comprising a halftone processor and a recording unit motor processor.

15. An image reproducing system as recited in claim 14, in which the pickup unit control processor comprises an input data storing means for storing (a) data to be supplied to the pickup unit motor processor, said data being input from a data input means, (b) data to be supplied to the color computation processor and (c) data to be supplied to the magnification ratio processor.

16. An image reproducing system as recited in claim 14, in which the pickup unit control processor comprises:

(a) a data distributing means for distributing scanning condition data to the pickup unit motor processor, the color computation processor and the ®magnification ratio processor, said scanning condition data to be supplied by said pickup unit motor processor, said color computation processor, and said magnification ratio processor to corresponding ones of said implement circuits; and (b) a process completion signal output means for outputting a process completion signal to the master processor when the subordinate processors interfacing with said pickup unit control processor terminate supply of data to the corresponding ones of said implement circuits or when an image reproduction process for an original is completed.

17. An image reproducing system as recited in claim 14, in which the recording unit control processor comprises:

(a) a data distributing means for distributing scanning condition data to the halftone dot processor and the recording unit motor processor, said scanning condition data to be supplied by said halftone dot processor and said recording unit motor processor to corresponding ones of said implement circuits; and (b) a process completion signal output means for outputting a process completion signal to the master processor when the subordinate processors interfacing with said recording unit control processor terminate supply of data to the corresponding ones of said implement circuits or when an image reproduction process for an original is completed.

18. An image reproducing system as recited in claim 14, wherein said implement circuits comprise pickup unit motor controller means connected to and controlled by said pickup unit motor processor, color computer means connected to and controlled by said color computation processor, magnification ratio converter means connected to and controlled by said magnification ratio processor, image editor means connected to and controlled by an image editing processor in turn connected to and controlled by said main processor, halftone dot generator means connected to and controlled by said halftone dot processor, recording unit motor controller means connected to and controlled by said recording unit motor processor and film loader means connected to and controlled by said recording unit motor processor.

19. An image reproducing system as recited in claim 14, further comprising direct communication links for providing direct communication between said mediate processors and said programmable subordinate processors.

20. An image reproducing system in which image data obtained by scanning an original are processed and then used for causing a recording beam to record a reproduction image on a photosensitive material, comprising:

(a) an input data storing means for storing scanning condition data for use in reproducing images of plural originals, said scanning condition data being input by an operator via a data input means;

(b) a data transmitting means for transmitting to subordinate processors scanning condition data corresponding to a first original when an operator turns on a scanning start switch and further for transmitting to the subordinate processors scanning condition data corresponding to a succeeding original when an image reproduction process for the first original is completed;

(c) a plurality of implement circuits responsive to the subordinate processors; and (d) an image reproduction process start designation means for outputting an image reproduction process start designation signal to a master processor from one of the plurality of implement circuits via one of the subordinate processors after said scanning condition data are transmitted to the implement circuits via the subordinate processors.

21. An image reproducing system as recited in claim 20 which is arranged for accepting input of said scanning condition data for said succeeding original while the system is reproducing an image of the first original.

22. An image reproducing system in which image data obtained by scanning an original and processed and then used for causing a recording beam to record a reproduction image on a photosensitive material, comprising:

(a) a main processor for controlling programmable subordinate processors in order to record a plurality of reproduction images of plural originals mounted on an input scanning drum; and (b) programmable subordinate processors, respectively programmed for directly controlling, under the control of the main processor, a plurality of respective implement circuit which carry out respective processes on the image data;

(c) said main processor including data storing means for preliminary storage of data to be supplied to said subordinate processors prior to processing of said image data.

23. A multilevel image reproducing system in which image data obtained by scanning an original are processed and then used for causing a recording beam to record a reproduction image on a photosensitive material, comprising:

a multilevel processing structure including at least three levels of processing, wherein:

(a) a master processor means is provided at a first level for controlling programmable subordinate processors in order to record a plurality of reproduction images of plural originals mounted on an input scanning drum;

(b) plural mediate processor means are provided at a second level, said mediate processor means being controlled by said master processor means; and (c) plural programmable subordinate processors are provided at a third level, said plural programmable subordinate processors being respectively programmed for directly controlling, in response to one of said mediate processor means under control of said master processor means, at least one of a plurality of respective implement circuits to carry out respective processes on the image data;

said mediate processor means interfacing between the master processor means and the subordinate processor means, thereby providing a multilevel processing arrangement wherein a processor at one level controls a plurality of processors at an immediately lower level.

24. A multilevel image reproducing system as recited in claim 23, further comprising an additional programmable subordinate processor at said third level, said additional programmable subordinate processor being directly responsive to said master processor means independently of said mediate processor means at said second level, said additional programmable subordinate processor being programmed for directly controlling, in response to said master processor means, an additional implement circuit for carrying out an additional process on the image data.

25. A mutilevel image reproducing system as recited in claim 24, wherein said additional programmable subordinate processor comprises image editing processor means, said additional implement circuit comprising image editor means.

* * * * *